(12) United States Patent
Kilian et al.

(10) Patent No.: US 11,070,247 B2
(45) Date of Patent: Jul. 20, 2021

(54) OPTIMIZED HOPPING PATTERNS FOR DIFFERENT SENSOR NODES AND VARIABLE DATA LENGTHS ON THE BASIS OF THE TELEGRAM SPLITTING TRANSMISSION METHOD

(71) Applicants: Fraunhofer-Gesellschaft zur Foerderung der angewandten Forschung e.V., Munich (DE); Friedrich-Alexander-Universitaet Erlangen-Nuernberg, Erlangen (DE)

(72) Inventors: Gerd Kilian, Erlangen (DE); Josef Bernhard, Erlangen (DE); Joerg Robert, Erlangen (DE); Jakob Kneissl, Erlangen (DE); Johannes Wechsler, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/391,726

(22) Filed: Apr. 23, 2019

(65) Prior Publication Data

US 2019/0253102 A1 Aug. 15, 2019

Related U.S. Application Data

(63) Continuation of application No. PCT/EP2017/076938, filed on Oct. 24, 2017.

(30) Foreign Application Priority Data

Oct. 24, 2016 (DE) .................... 10 2016 220 882.9

(51) Int. Cl.
*H04B 1/7143* (2011.01)
*H04B 1/7156* (2011.01)
(Continued)

(52) U.S. Cl.
CPC ......... *H04B 1/7143* (2013.01); *H04B 1/7156* (2013.01); *H04B 7/12* (2013.01);
(Continued)

(58) Field of Classification Search
CPC ...... H04B 1/7143; H04B 1/7156; H04B 7/12; H04B 2001/71563; H04B 2201/71323;
(Continued)

(56) References Cited

U.S. PATENT DOCUMENTS 5,020,056 A 5/1991 Chennakeshu
6,130,885 A 10/2000 Izumi et al.
(Continued)

FOREIGN PATENT DOCUMENTS

CN 101626584 A 1/2010
CN 102474800 A 5/2012
(Continued)

OTHER PUBLICATIONS

Dolinar, Sam et al., "Turbo Code Performance as a Function of Code Block Size", 1998 IEEE International Symposium on Information Theory.
(Continued)

*Primary Examiner* — Brian D Nguyen
(74) *Attorney, Agent, or Firm* — Michael A. Glenn; Perkins Coie LLP

(57) ABSTRACT

Embodiments provide a transmission method of wireless transmission of data within a communication system (e.g. a sensor network or telemetry system). The system includes a step of transmitting the data while using at least two time hopping patterns and/or frequency hopping patterns, a second pattern of the at least two patterns being a time- and/or frequency-shifted version of a first pattern of the at least two patterns.

29 Claims, 6 Drawing Sheets

(51) Int. Cl.
*H04B 7/12* (2006.01)
*H04L 1/00* (2006.01)
*H04L 5/00* (2006.01)

(52) U.S. Cl.
CPC .......... *H04L 1/0061* (2013.01); *H04L 5/0007* (2013.01); *H04L 5/0012* (2013.01); *H04L 5/0048* (2013.01); *H04B 2001/71563* (2013.01); *H04B 2201/71323* (2013.01)

(58) Field of Classification Search
CPC ... H04L 1/0061; H04L 5/0007; H04L 5/0048; H04L 5/0012
See application file for complete search history.

(56) References Cited

U.S. PATENT DOCUMENTS

| | | | |
|---|---|---|---|
| 8,077,593 | B2 | 12/2011 | Iwai et al. |
| 8,175,134 | B1 | 5/2012 | Giallorenzi et al. |
| 8,358,613 | B1 | 1/2013 | Giallorenzi et al. |
| 10,348,477 | B2 * | 7/2019 | You .......................... H04L 5/10 |
| 2002/0013135 | A1 | 1/2002 | Proctor |
| 2003/0140298 | A1 | 7/2003 | Koprivica |
| 2004/0082353 | A1 * | 4/2004 | Kekki .................... H04W 52/54 455/522 |
| 2004/0109419 | A1 * | 6/2004 | Sano .................... H04B 1/7136 370/320 |
| 2005/0176371 | A1 | 8/2005 | Palin et al. |
| 2006/0104333 | A1 | 5/2006 | Rainbolt et al. |
| 2007/0133462 | A1 * | 6/2007 | Guey .................... H04L 5/0048 370/330 |
| 2008/0043813 | A1 | 2/2008 | Azenkot et al. |
| 2008/0117954 | A1 | 5/2008 | Chuang et al. |
| 2009/0116599 | A1 * | 5/2009 | McCoy ................ H04L 5/0053 375/362 |
| 2010/0002750 | A1 | 1/2010 | Hardacker et al. |
| 2010/0110929 | A1 | 5/2010 | Li et al. |
| 2010/0238787 | A1 * | 9/2010 | Guey .................. H04L 27/2657 370/208 |
| 2010/0309953 | A1 * | 12/2010 | Park ...................... H04B 1/713 375/135 |
| 2011/0013531 | A1 | 1/2011 | Liu |
| 2011/0038398 | A1 * | 2/2011 | Konno .................. H04L 5/0048 375/133 |
| 2011/0255433 | A1 * | 10/2011 | Roh ...................... H04L 25/022 370/252 |
| 2012/0002613 | A1 * | 1/2012 | Kishiyama ........ H04W 74/0866 370/329 |
| 2013/0170467 | A1 * | 7/2013 | Ogawa .................. H04L 5/0012 370/329 |
| 2013/0230060 | A1 | 9/2013 | Bernhard et al. |
| 2013/0301681 | A1 * | 11/2013 | Hassan .................. H04B 1/713 375/132 |
| 2014/0176341 | A1 | 6/2014 | Bernhard et al. |
| 2014/0192756 | A1 * | 7/2014 | Baldemair ............ H04L 5/0039 370/329 |
| 2014/0192789 | A1 | 7/2014 | Bernhard et al. |
| 2014/0269842 | A1 | 9/2014 | Lacatus et al. |
| 2014/0286455 | A1 | 9/2014 | Choi et al. |
| 2015/0009894 | A1 | 1/2015 | Vermani et al. |
| 2015/0016426 | A1 | 1/2015 | Merlin et al. |
| 2015/0029962 | A1 | 1/2015 | Yun et al. |
| 2015/0180534 | A1 | 6/2015 | Lacatus et al. |
| 2016/0044729 | A1 | 2/2016 | Tu et al. |
| 2016/0057798 | A1 * | 2/2016 | Chae ..................... H04W 72/02 370/280 |
| 2016/0094269 | A1 | 3/2016 | Seller |
| 2016/0211883 | A9 * | 7/2016 | Dahlman ............... H04B 1/713 |
| 2016/0235301 | A1 | 8/2016 | Melodia et al. |
| 2016/0366649 | A1 | 12/2016 | Bernhard et al. |
| 2018/0152264 | A1 | 5/2018 | Kilian et al. |
| 2018/0183491 | A1 * | 6/2018 | Takeda .................... H04B 7/12 |
| 2019/0253102 | A1 | 8/2019 | Kilian et al. |

FOREIGN PATENT DOCUMENTS

| | | |
|---|---|---|
| CN | 103701490 A | 4/2014 |
| CN | 104285383 A | 1/2015 |
| CN | 105009469 A | 10/2015 |
| CN | 105359597 A | 2/2016 |
| DE | 102010043151 A1 | 5/2012 |
| DE | 102011082098 B4 | 3/2013 |
| DE | 102011082100 A1 | 3/2013 |
| EP | 2151928 A1 | 2/2010 |
| EP | 2487503 A1 | 8/2012 |
| EP | 2763321 A1 | 8/2014 |
| EP | 2914039 A1 | 9/2015 |
| EP | 3125453 A1 | 2/2017 |
| JP | H08181637 A | 7/1996 |
| JP | H11284547 A | 10/1999 |
| JP | 2003218743 A | 7/2003 |
| JP | 2011188316 A | 9/2011 |
| JP | 2012507974 A | 3/2012 |
| JP | 2016519463 A | 6/2016 |
| RU | 2418370 C2 | 5/2011 |
| RU | 2479929 C2 | 4/2013 |
| WO | 2005022799 A1 | 3/2005 |
| WO | 2007089797 A2 | 8/2007 |
| WO | 2007140088 A2 | 12/2007 |
| WO | 2009064647 A1 | 5/2009 |
| WO | 2009115563 A1 | 9/2009 |
| WO | 2009139724 A1 | 11/2009 |
| WO | 2010079953 A2 | 7/2010 |
| WO | 2012109542 A1 | 8/2012 |
| WO | 2014/179474 A1 | 11/2014 |
| WO | 2015128385 A1 | 9/2015 |
| WO | 2016064315 A1 | 4/2016 |

OTHER PUBLICATIONS

Kilian, Gerd et al., "Improved Coverage for Low-Power Telemetry Systems using Telegram Splitting", Proceedings of 2013 European Conference on Smart Objects, Systems, and Technologies (SmartSysTech), Jun. 11, 2013.

Kilian, Gerd et al., "Increasing Transmission Reliability for Telemetry Systems Using Telegram Splitting", IEEE Transactions on Communications, vol. 63, No. 3, pp. 949-961, Mar. 2015, Mar. 2015, pp. 949-961.

Lam, Alex W. et al., "Time-Hopping and Frequency-Hopping Multiple-Access Packet Communications", IEEE Transactions on Communications, IEEE Service Center, Piscataway, NJ. USA, Band 38, Nr. 6, Jun. 1, 1990 (Jun. 1, 1990), Seite 875-888, XP002671768, Jun. 1, 1990.

Samsung, "Time-frequency hopping design for Mode 2 resource allocation", 3rd Generation Partnership Project (3GPP), Mobile Competence Centre; 650, Route Des Lucioles, Aug. 17, 2014.

\* cited by examiner

OPTIMIZED HOPPING PATTERNS FOR DIFFERENT SENSOR NODES AND VARIABLE DATA LENGTHS ON THE BASIS OF THE TELEGRAM SPLITTING TRANSMISSION METHOD

CROSS-REFERENCES TO RELATED APPLICATIONS

This application is a continuation of copending International Application No. PCT/EP2017/076938, filed Oct. 24, 2017, which is incorporated herein by reference in its entirety, and additionally claims priority from German Application No. DE 10 2016 220 882.9, filed Oct. 24, 2016, which is incorporated herein by reference in its entirety.

Embodiments of the present invention relate to a data transmitter for transmitting data. Further embodiments relate to a data receiver for receiving data. Some embodiments relate to optimized hopping patterns for different sensor nodes and variable data lengths on the basis of the telegram splitting transmission method.

BACKGROUND OF THE INVENTION

DE 10 2011 082 098 B4 describes a method for battery-operated transmitters wherein the data packet is subdivided into transmit packets which are smaller than the actual information to be transmitted (so-called telegram splitting). Telegrams are split up into several subpackets. Such a subpacket is referred to as a hop. Several information symbols are transmitted in one hop. The hops are sent at one frequency or distributed across several frequencies, so-called frequency hopping. Between the hops, there are breaks during which no transmission takes place.

In a typical sensor network, several 100,000 sensor nodes are covered by only one base station. Since the sensor nodes have only very small batteries, coordination of the transmissions is hardly possible in most cases. By means of the telegram splitting method, very high transmission reliability is achieved for this purpose.

Ideally, each sensor node has a hopping pattern of its own (in terms of time and possibly frequency), so that full superposition of two telegrams is not possible. However, due to limited computing power within the base station it is not possible to use any number of hopping sequences desired. This results in complete superposition of the telegrams when two telegrams are sent out simultaneously by two sensor nodes. Among those two telegrams, normally only one or none of the two telegrams can be correctly decoded.

DE 10 2011 082 100 A1 describes a base station comprising bidirectional data transmission to a node. The base station comprises means for receiving a data packet sent by the node at a node transmission frequency, the node transmission frequency being derived from a frequency generator of the node. In addition, the base station comprises means for determining the node transmission frequency on the basis of the data packet received and for determining a deviation of the frequency generator of the node on the basis of a frequency deviation between the node transmission frequency determined and a target node transmission frequency associated with the node. Furthermore, the base station comprises means for sending a data packet to the node at a base station transmission frequency, the means for sending the data packet being configured to set the base station transmission frequency on the basis of the determined deviation of the frequency generator of the node.

WO 2015/128385 A1 describes a data transmit arrangement comprising an energy harvesting element as its energy source. The data transmit arrangement is configured to send data while using the telegram splitting method, wherein a subpacket about to be sent is either sent, buffered and sent later, or discarded as a function of an amount of electrical energy that may be provided by the energy supply means.

The publication [G. Kilian, H. Petkov, R. Psiuk, H. Lieske, F. Beer, J. Robert, and A. Heuberger, "Improved coverage for low-power telemetry systems using telegram splitting," in Proceedings of 2013 European Conference on Smart Objects, Systems and Technologies (SmartSysTech), 2013] describes improved coverage for low-energy telemetry systems using the telegram splitting method.

The publication [G. Kilian, M. Breiling, H. H. Petkov, H. Lieske, F. Beer, J. Robert, and A. Heuberger, "Increasing Transmission Reliability for Telemetry Systems Using Telegram Splitting," IEEE Transactions on Communications, vol. 63, no. 3, pp. 949-961, March 2015] describes improved transmission reliability for low-energy telemetry systems using the telegram splitting method.

The publication [Sam Dolinar, Dariush Divsalar, and Fabrizio Pollara, "Turbo Code Performance as a Function of Code Block Size", 1998 IEEE International Symposium on Information Theory] describes the performance of turbo codes as a function of a block size.

SUMMARY

An embodiment may have a data transmitter configured to send out data while using at least two time and frequency hopping patterns, a second pattern of the at least two patterns being a time- and/or frequency-shifted version of a first pattern of the at least two patterns); wherein the data includes a plurality of data packets, the data transmitter being configured to send out at least two data packets of the plurality of data packets while using the first pattern and to send out at least two further data packets of the plurality of data packets while using the second pattern; wherein the data is a telegram, the data transmitter being configured to split up the telegram into the plurality of data packets, each of the plurality of data packets being shorter than the telegram; the data transmitter being configured to distribute a synchronization sequence for synchronizing the data within one data receiver across the two patterns.

Another embodiment may have a data receiver configured to receive data while using at least two time and frequency hopping patterns, a second pattern of the at least two patterns being a time- and/or frequency-shifted version of a first pattern of the at least two patterns); wherein the data includes a plurality of data packets, at least two data packets of the plurality of data packets being sent out while using the first pattern, and wherein at least two further data packets of the plurality of data packets are sent out by using the second pattern, the data receiver being configured to receive the at least two data packets in accordance with the first pattern and to receive the at least two further data packets in accordance with the second pattern); wherein the data is a telegram that is split up into the plurality of data packets, each of the plurality of data packets being shorter than the telegram; the data receiver being configured to combine at least some of the plurality of data packets in order to obtain the telegram; the data receiver being configured to perform a first synchronization for the first pattern in order to obtain a first synchronization result, and to perform a second synchronization for the second pattern in order to obtain a second synchronization result; the data receiver being configured
to combine the first synchronization result and the second synchronization result
or to perform the second synchronization for the second pattern while using the first synchronization result
in order to obtain a total synchronization result.

According to another embodiment, a system may have: an inventive data transmitter; and an inventive data receiver.

Another embodiment may have a data transmitter configured to send out data of variable lengths while using a first time hopping pattern and/or frequency hopping pattern and while using a second time hopping pattern and/or frequency hopping pattern, the first time hopping pattern and/or frequency hopping pattern including a fixed length and the second time hopping pattern and/or frequency hopping pattern including a variable length; the data transmitter being configured to generate the second time hopping pattern and/or frequency hopping pattern on the basis of the portion of the data contained within the first time hopping pattern and/or frequency hopping pattern; wherein the data includes error protection data, the data transmitter being configured to generate the second time hopping pattern and/or frequency hopping pattern on the basis of the error protection data or of a portion of the error protection data.

Another embodiment may have a data transmitter configured to send out data of variable lengths while using a first time hopping pattern and/or frequency hopping pattern and while using a second time hopping pattern and/or frequency hopping pattern, the first time hopping pattern and/or frequency hopping pattern including a fixed length, and the second time hopping pattern and/or frequency hopping pattern including a variable length; the data transmitter being configured to generate the second time hopping pattern and/or frequency hopping pattern on the basis of the portion of the data contained within the first time hopping pattern and/or frequency hopping pattern.

Another embodiment may have a data transmitter configured to send out data of variable lengths while using a first time hopping pattern and/or frequency hopping pattern and while using a second time hopping pattern and/or frequency hopping pattern, the first time hopping pattern and/or frequency hopping pattern including a fixed length, and the second time hopping pattern and/or frequency hopping pattern including a variable length; the data transmitter being configured to provide the data contained within the first time hopping pattern and/or frequency hopping pattern with information about the length of the second time hopping pattern and/or frequency hopping pattern so as to signal the length of the second time hopping pattern and/or frequency hopping pattern.

Another embodiment may have a data receiver configured to receive data of variable lengths while using a first time hopping pattern and/or frequency hopping pattern and while using a second time hopping pattern and/or frequency hopping pattern, the first time hopping pattern and/or frequency hopping pattern including a fixed length, and the second time hopping pattern and/or frequency hopping pattern including a variable length; the data receiver being configured to generate the second time hopping pattern and/or frequency hopping pattern on the basis of a portion of the data contained within the first time hopping pattern and/or frequency hopping pattern; the data receiver being configured to generate the second time hopping pattern and/or frequency hopping pattern on the basis of error protection data or of a portion of the error protection data contained within the data contained within the first time hopping pattern and/or frequency hopping pattern.

Another embodiment may have a data receiver configured to receive data of variable lengths while using a first time hopping pattern and/or frequency hopping pattern and while using a second time hopping pattern and/or frequency hopping pattern, the first time hopping pattern and/or frequency hopping pattern including a fixed length, and the second time hopping pattern and/or frequency hopping pattern including a variable length; the data receiver being configured to generate the second time hopping pattern and/or frequency hopping pattern on the basis of a portion of the data contained within the first time hopping pattern and/or frequency hopping pattern.

Another embodiment may have a data receiver configured to receive data of variable lengths while using a first time hopping pattern and/or frequency hopping pattern) and while using a second time hopping pattern and/or frequency hopping pattern, the first time hopping pattern and/or frequency hopping pattern including a fixed length, and the second time hopping pattern and/or frequency hopping pattern) including a variable length; wherein the data contained within the first time hopping pattern and/or frequency hopping pattern is provided with information about the length of the second time hopping pattern and/or frequency hopping pattern; the data receiver being configured to extract the information about the length of the second time hopping pattern and/or frequency hopping pattern from the data.

According to another embodiment, a system may have: an inventive data transmitter; and an inventive data receiver.

According to another embodiment, a method of transmitting data may have the steps of: transmitting the data while using two time hopping patterns or frequency hopping patterns, a second pattern of the two patterns being a time- or frequency-shifted version of a first pattern of the two patterns; wherein the data includes a plurality of data packets, wherein at least two data packets of the plurality of data packets are sent out by using the first pattern, and wherein at least two further data packets of the plurality of data packets are sent out by using the second pattern; wherein the data is a telegram, the telegram is split up into the plurality of data packets, each of the plurality of data packets being shorter than the telegram; a synchronization sequence for synchronizing the data within a data receiver is distributed across the two patterns.

According to another embodiment, a method of receiving data may have the steps of: receiving the data while using two time hopping patterns or frequency hopping patterns, a second pattern of the two patterns being a time- or frequency-shifted version of a first pattern of the two patterns; wherein the data includes a plurality of data packets, wherein at least two data packets of the plurality of data packets are sent out by using the first pattern, and wherein at least two further data packets of the plurality of data packets are sent out by using the second pattern; wherein the at least two data packets are received in accordance with the first pattern, and wherein the at least two further data packets are received in accordance with the second pattern; wherein the data is a telegram split up into the plurality of data packets, each of the plurality of data packets being shorter than the telegram; the method further including a step of combining at least a portion of the plurality of data packets in order to obtain the telegram; wherein the method further includes a step of performing a first synchronization for the first pattern in order to obtain a first synchronization result, and a step of performing a second synchronization for the second pattern in order to obtain a second synchronization result; the method may further have the step of:

combining the first synchronization result and the second synchronization result, or performing the second synchronization for the second pattern while using the first synchronization result, in order to obtain a total synchronization result.

According to another embodiment, a method of transmitting data of variable lengths may have the steps of: transmitting the data of variable lengths while using a first time/frequency hopping pattern and a second time/frequency hopping pattern, the first time/frequency hopping pattern including a fixed length, and the second time/frequency hopping pattern including a variable length; wherein the second time hopping pattern and/or frequency hopping pattern is generated on the basis of a portion of the data contained within the first time hopping pattern and/or frequency hopping pattern; and wherein the second time hopping pattern and/or frequency hopping pattern is generated on the basis of error protection data or of a portion of the error protection data contained within the first time hopping pattern and/or frequency hopping pattern.

According to another embodiment, a method of receiving data of variable lengths may have the steps of: receiving the data of variable lengths while using a first time/frequency hopping pattern and a second time/frequency hopping pattern, the first time/frequency hopping pattern including a fixed length, and the second time/frequency hopping pattern including a variable length; wherein the second time hopping pattern and/or frequency hopping pattern is generated on the basis of a portion of the data contained within the first time hopping pattern and/or frequency hopping pattern; wherein the second time hopping pattern and/or frequency hopping pattern is generated on the basis of error protection data or of a portion of the error protection data contained within the first time hopping pattern and/or frequency hopping pattern.

According to another embodiment, a non-transitory digital storage medium may have a computer program stored thereon to perform the inventive methods, when said computer program is run by a computer.

Embodiments provide a data receiver configured to receive data while using at least two time hopping patterns and/or frequency hopping patterns, a second pattern of the at least two patterns being a time- and/or frequency-shifted version of a first pattern of the at least two patterns.

In embodiments, two identical time hopping patterns and/or frequency hopping patterns which are shifted relative to each other in time and/or frequency are used for transmitting the data, so that the data sent out by using the two time hopping patterns and/or frequency hopping patterns do not superimpose one another.

Embodiments provide a data transmitter configured to send out data of variable lengths while using a first time hopping pattern and/or frequency hopping pattern and while using a second time hopping pattern and/or frequency hopping pattern, the first time hopping pattern and/or frequency hopping pattern having a fixed length, and the second time hopping pattern and/or frequency hopping pattern having variable lengths.

Embodiments provide a data receiver configured to receive data of variable lengths while using a first time hopping pattern and/or frequency hopping pattern and a second time hopping pattern and/or frequency hopping pattern, the first time hopping pattern and/or frequency hopping pattern having a fixed length, and the second time hopping pattern and/or frequency hopping pattern having variable lengths.

In embodiments, time hopping patterns and/or frequency hopping patterns are used for transmitting the data of variable lengths, the first time hopping pattern and/or frequency hopping pattern having a fixed length, and the second time hopping pattern and/or frequency hopping pattern having variable lengths.

Further embodiments provide a method of transmitting data. The method includes a step of sending the data while using two time hopping patterns or frequency hopping patterns, a second pattern of the two patterns being a time- or frequency-shifted version of a first pattern of the two patterns.

Further embodiments provide a method of receiving data. The method includes a step of receiving the data while using two time hopping patterns or frequency hopping patterns, a second pattern of the two patterns being a time- or frequency-shifted version of a first pattern of the two patterns.

Further embodiments provide a method of sending data. The method includes a step of sending the data of variable lengths while using a first time/frequency hopping pattern and a second time/frequency hopping pattern, the first time/frequency hopping pattern comprising a fixed length, and the second time/frequency hopping pattern comprising variable lengths.

Further embodiments provide a method of receiving data. The method includes a step of receiving the data of variable lengths while using a first time/frequency hopping pattern and a second time/frequency hopping pattern, the first time/frequency hopping pattern comprising a fixed length, and the second time/frequency hopping pattern comprising variable lengths.

Further embodiments provide a transmission method for wireless transmission of data within a communication system (e.g., a sensor network or telemetry system). The method includes a step of transmitting the data while using at least two time hopping patterns and/or frequency hopping patterns, a second pattern of the at least two patterns being a time- and/or frequency-shifted version of a first pattern of the at least two patterns.

Further embodiments provide a transmission method for wireless transmission of data within a communication system (e.g., a sensor network or telemetry system). The method includes a step of transmitting the data while using a first time hopping pattern and/or frequency hopping pattern and a second time hopping pattern and/or frequency hopping pattern, the first time hopping pattern and/or frequency hopping pattern having a fixed length, and the second time hopping pattern and/or frequency hopping pattern having variable lengths.

In the following, advantageous embodiments of the data transmitter will be described which is configured to send out data while using at least two time hopping patterns and/or frequency hopping patterns, a second pattern of the at least two patterns being a time- and/or frequency-shifted version of a first pattern of the at least two patterns.

In embodiments, the frequency hopping pattern may indicate a sequence of transmission frequencies or transmission frequency hops at which the data is to be sent.

For example, a first portion of the data may be sent at a first transmission frequency (or within a first frequency channel), and a second portion of the data may be sent at a second transmission frequency (or within a second frequency channel), the first transmission frequency and the second transmission frequency being different. In this context, the frequency hopping pattern may define (or specify or indicate) the first transmission frequency and the second transmission frequency. Alternatively, the frequency hopping pattern may indicate the first transmission frequency and a frequency interval (transmission frequency hop) between the first transmission frequency and the second transmission frequency. Of course, the frequency hopping pattern may indicate only the frequency interval (transmission frequency hop) between the first transmission frequency and the second transmission frequency.

In embodiments, the time hopping pattern may indicate a sequence of transmission times or transmission time intervals at which the data is to be sent.

For example, a first portion of the data may be sent at a first transmission time (or within a first transmission time slot), and a second portion of the data may be sent at a second transmission time (or within a second transmission time slot), the first transmission time and the second transmission time being different. The time hopping pattern may define (or specify or indicate) the first transmission time and the second transmission time. Alternatively, the time hopping pattern may indicate the first transmission time and a time interval between the first transmission time and the second transmission time. Of course, the time hopping pattern may indicate only the time interval between the first time and the second transmission time.

In embodiments, the data may include a plurality of data packets, the data transmitter being configured to send out at least two data packets of the plurality of data packets while using the first pattern and to send out at least two further data packets of the plurality of data packets while using a second pattern.

For example, the plurality of data packets may contain a different or overlapping portion of the data, respectively, so that the data is not transmitted en bloc but in a state in which it is split up into the data packets.

The data may be a telegram, the data transmitter being configured to split up the telegram into the plurality of data packets, each of the plurality of data packets being shorter than the telegram.

In embodiments, the data transmitter may be configured to distribute a synchronization sequence for synchronizing the data within one data receiver across the two patterns.

The data transmitter may be being configured to split up the synchronization sequence into at least two partial synchronization sequences and to provide at least two of the plurality of data packets with one of the at least two partial synchronization sequences.

In the following, advantageous embodiments of the data receiver will be described which is configured to receive data while using at least two time hopping patterns and/or frequency hopping patterns, a second pattern of the at least two patterns being a time- and/or frequency-shifted version of a first pattern of the at least two patterns.

In embodiments, the frequency hopping pattern may indicate a sequence of reception frequencies or reception frequency hops at which the data is to be received.

For example, a first portion of the data may be received at a first reception frequency (or within a first frequency channel), and a second portion of the data may be received at a second reception frequency (or within a second frequency channel), the first reception frequency and the second reception frequency being different. The frequency hopping pattern may define (or specify or indicate) the first reception frequency and the second reception frequency. Alternatively, the frequency hopping pattern may indicate the first reception frequency and a frequency interval (reception frequency hop) between the first reception frequency and the second reception frequency. Of course, the frequency hopping pattern may indicate only the frequency interval (reception frequency hop) between the first reception frequency and the second reception frequency.

In embodiments, the time hopping pattern may indicate a sequence of reception times or reception time intervals at which the data is to be received.

For example, a first portion of the data may be received at a first reception time (or within a first reception time slot), and a second portion of the data may be received at a second reception time (or within a second reception time slot), the first reception time and the second reception time being different. The time hopping pattern may define (or specify or indicate) the first reception time and the second reception time. Alternatively, the time hopping pattern may indicate the first reception time and a time interval between the first reception time and the second reception time. Of course, the time hopping pattern may indicate only the time interval between the first reception time and the second reception time.

In embodiments, the data may include a plurality of data packets, wherein the data receiver may be configured to receive the at least two data packets in accordance with the first pattern and to receive the at least two further data packets in accordance with the second pattern.

The data may be a telegram that is split up into the plurality of data packets, each of the plurality of data packets being shorter than the telegram. The data receiver may be configured to combine at least some of the plurality of data packets in order to obtain the telegram.

In embodiments, the data receiver may be configured to perform a first synchronization for the first pattern in order to obtain a first synchronization result, and to perform a second synchronization for the second pattern in order to obtain a second synchronization result. The data receiver may be configured to combine the first synchronization result and the second synchronization result in order to obtain a total synchronization result.

In addition, the data receiver may be configured to perform a first synchronization for the first pattern in order to obtain a first synchronization result, and to perform a second synchronization for the second pattern while using the first synchronization result in order to obtain a total synchronization result.

The data receiver may be configured to obtain a further synchronization result for the second synchronization while using the first synchronization result in order to obtain a further total synchronization result.

In addition, the data receiver may be configured to obtain a second synchronization result for the second synchronization and to combine the first synchronization result of the first synchronization and the second synchronization result of the second synchronization in order to obtain a total synchronization result.

In embodiments, a synchronization sequence for synchronizing the data may be distributed across the at least two patterns, wherein the data receiver may be configured to perform synchronization while using the synchronization sequence in order to detect the data in a reception data stream.

For example, at least two of the plurality of data packets may be provided with a partial synchronization sequence, respectively, of at least two partial synchronization sequences into which the synchronization sequence is split up, wherein the data receiver may be configured to perform synchronization while using the partial synchronization sequences in order to detect the data in a reception data stream.

In the following, advantageous embodiments of the data transmitter will be described which is configured to send out data of variable lengths while using a first time hopping pattern and/or frequency hopping pattern and while using a second time hopping pattern and/or frequency hopping pattern, the first time hopping pattern and/or frequency hopping pattern comprising a fixed length and the second time hopping pattern and/or frequency hopping pattern comprising a variable length.

In embodiments, the frequency hopping pattern may indicate a sequence of transmission frequencies or transmission frequency hops at which the data is to be sent.

For example, a first portion of the data may be sent at a first transmission frequency (or within a first frequency channel), and a second portion of the data may be sent at a second transmission frequency (or within a second frequency channel), the first transmission frequency and the second transmission frequency being different. In this context, the frequency hopping pattern may define (or specify or indicate) the first transmission frequency and the second transmission frequency. Alternatively, the frequency hopping pattern may indicate the first transmission frequency and a frequency interval (transmission frequency hop) between the first transmission frequency and the second transmission frequency. Of course, the frequency hopping pattern may indicate only the frequency interval (transmission frequency hop) between the first transmission frequency and the second transmission frequency.

In embodiments, the time hopping pattern may indicate a sequence of transmission times or transmission time intervals at which the data is to be sent.

For example, a first portion of the data may be sent at a first transmission time (or within a first transmission time slot), and a second portion of the data may be sent at a second transmission time (or within a second transmission time slot), the first transmission time and the second transmission time being different. The time hopping pattern may define (or specify or indicate) the first transmission time and the second transmission time. Alternatively, the time hopping pattern may indicate the first transmission time and a time interval between the first transmission time and the second transmission time. Of course, the time hopping pattern may indicate only the time interval between the first time and the second transmission time.

In embodiments, the data may include a plurality of data packets, the first time hopping pattern and/or frequency hopping pattern comprising a fixed number of the plurality of data packets, and the second time hopping pattern and/or frequency hopping pattern comprising a variable number of the plurality of data packets.

For example, the data of variable lengths may be subdivided into the plurality of data packets, so that each data packet of the plurality of data packets comprises a portion of the data of variable lengths.

The data of variable lengths may include a data portion having a fixed length and a data portion having variable lengths. The data transmitter may be configured to send out the data portion having a fixed length by using the first time hopping pattern and/or frequency hopping pattern and to send out the data portion of variable lengths by using the second time hopping pattern and/or frequency hopping pattern.

The data may be a telegram, the data transmitter being configured to split up the telegram into the plurality of data packets, each of the plurality of data packets being shorter than the telegram.

In embodiments, the first time hopping pattern and/or frequency hopping pattern and the second time hopping pattern and/or frequency hopping pattern may differ from one other even in the event that they have equal lengths.

In embodiments, a portion of the second time hopping pattern and/or frequency hopping pattern may be identical with a corresponding portion of the first time hopping pattern and/or frequency hopping pattern. Both portions may comprise the length of the shorter one among the first time hopping pattern and/or frequency hopping pattern and the second time hopping pattern and/or frequency hopping pattern.

For example, the same pattern may be used for the first time hopping pattern and/or frequency hopping pattern and for the second time hopping pattern and/or frequency hopping pattern, transmission of the data of variable lengths by using the second time hopping pattern and/or frequency hopping pattern being simply terminated as soon as the data of variable lengths has/have been (fully) transmitted, i.e., no dummy data is attached in order to fully transmit the pattern, or the pattern is re-used, or repeated, in the event that not all of the data of variable lengths has/have been (fully) transmitted yet.

In embodiments, the data transmitter may be configured to provide the data contained within the first time hopping pattern and/or frequency hopping pattern with information about the length of the second time hopping pattern and/or frequency hopping pattern so as to signal the length of the second time hopping pattern and/or frequency hopping pattern.

For example, the data transmitter may be configured to use a portion of the data contained within the first time hopping pattern and/or frequency hopping pattern for signaling the length of the second time hopping pattern and/or frequency hopping pattern.

In embodiments, the data transmitter may be configured to append information about the length of the second time hopping pattern and/or frequency hopping pattern to the data, so that a portion of the data contained within the first time hopping pattern and/or frequency hopping pattern may be used for signaling the length of the second time hopping pattern and/or frequency hopping pattern.

In embodiments, the data transmitter may be configured to generate the second time hopping pattern and/or frequency hopping pattern on the basis of (a portion of) the data contained within the first time hopping pattern and/or frequency hopping pattern.

For example, the data may comprise error protection data, wherein the data transmitter may be configured to generate the second time hopping pattern and/or frequency hopping pattern on the basis of the error protection data or of a portion of the error protection data.

In addition, the data transmitter may be configured to generate the second time hopping pattern and/or frequency hopping pattern on the basis of that portion of the data which is used for signaling the length of the second time hopping pattern and/or frequency hopping pattern.

In embodiments, the data transmitter may be configured to generate a synchronization sequence for the second time hopping pattern and/or frequency hopping pattern on the basis of a portion of the data contained within the first time hopping pattern and/or frequency hopping pattern.

For example, the data transmitter may be configured to generate the synchronization sequence for the second time hopping pattern and/or frequency hopping pattern on the basis of that portion of the data which is used for signaling the length of the second time hopping pattern and/or frequency hopping pattern.

In embodiments, the data transmitter may be configured to provide the first time hopping pattern and/or frequency hopping pattern and the second time hopping pattern and/or frequency hopping pattern with different synchronization sequences.

The data transmitter may be configured to provide the first time hopping pattern and/or frequency hopping pattern and the second time hopping pattern and/or frequency hopping pattern with synchronization sequences of different lengths.

The data transmitter may be configured to transmit the data contained within the first time hopping pattern and/or frequency hopping pattern at a data rate different from that used for the data contained within the second time hopping pattern and/or frequency hopping pattern.

The data transmitter may be configured to generate the data rate at which the second time hopping pattern and/or frequency hopping pattern is transmitted on the basis of the portion of the data.

For example, the data transmitter may be configured to generate the data rate at which the second time hopping pattern and/or frequency hopping pattern is transmitted on the basis of that portion of the data which is used for signaling the length of the second time hopping pattern and/or frequency hopping pattern.

In embodiments, the data transmitter may be configured to transmit the data contained within the first time hopping pattern and/or frequency hopping pattern by means of a transmission method different from that used for the data contained within the second time hopping pattern and/or frequency hopping pattern.

For example, the data transmitter may be configured to generate the transmission method by means of which the second time hopping pattern and/or frequency hopping pattern is transmitted on the basis of a portion of the data.

In addition, the data transmitter may be configured to generate the transmission method by means of which the second time hopping pattern and/or frequency hopping pattern is transmitted on the basis of that portion of the data which is used for signaling the length of the second time hopping pattern and/or frequency hopping pattern.

In embodiments, the data transmitter may be configured to use two time hopping subpatterns and/or frequency hopping subpatterns as the first time hopping pattern and/or frequency hopping pattern, a second time hopping subpattern and/or frequency hopping subpattern of the two time hopping subpatterns and/or frequency hop time patterns being a time- or frequency-shifted version of a first time hopping subpattern and/or frequency hopping subpattern of the two time hopping subpatterns and/or frequency hopping subpatterns.

In addition, the data transmitter may be configured to use two time hopping subpatterns and/or frequency hopping subpatterns as the second time hopping pattern and/or frequency hopping pattern, a second time hopping subpattern and/or frequency hopping subpattern of the two time hopping subpatterns and/or frequency hop time patterns being a time- or frequency-shifted version of a first time hopping subpattern and/or frequency hopping subpattern of the two time hopping subpatterns and/or frequency hopping subpatterns.

For example, the data transmitter may be configured to provide the two time hopping subpatterns and/or frequency hopping subpatterns with different synchronization sequences.

In the following, advantageous embodiments of the data receiver will be described which is configured to receive data of variable lengths while using a first time hopping pattern and/or frequency hopping pattern and a second time hopping pattern and/or frequency hopping pattern, the first time hopping pattern and/or frequency hopping pattern comprising a fixed length and the second time hopping pattern and/or frequency hopping pattern comprising a variable length.

In embodiments, the frequency hopping pattern may indicate a sequence of reception frequencies or reception frequency hops by means of which the data is to be received.

For example, a first portion of the data may be received at a first reception frequency (or within a first frequency channel), and a second portion of the data may be received at a second reception frequency (or within a second frequency channel), the first reception frequency and the second reception frequency being different. The frequency hopping pattern may define (or specify or indicate) the first reception frequency and the second reception frequency. Alternatively, the frequency hopping pattern may indicate the first reception frequency and a frequency interval (reception frequency hop) between the first reception frequency and the second reception frequency. Of course, the frequency hopping pattern may also indicate only the frequency interval (reception frequency hop) between the first reception frequency and the second reception frequency.

In embodiments, the time hopping pattern may indicate a sequence of reception times or reception time intervals at which the data is to be received.

For example, a first portion of the data may be received at a first reception time (or within a first reception time slot), and a second portion of the data may be received at a second reception time (or within a second reception time slot), the first reception time and the second reception time being different. The time hopping pattern may define (or specify or indicate) the first reception time and the second reception time. Alternatively, the time hopping pattern may indicate the first reception time and a time interval between the first reception time and the second reception time. Of course, the time hopping pattern may also indicate only the time interval between the first reception time and the second reception time.

In embodiments, the data receiver may be configured to determine a length of the second time hopping pattern and/or frequency hopping pattern from the data contained within the first time hopping pattern and/or frequency hopping pattern.

In embodiments, the data may comprise a plurality of data packets, the first time hopping pattern and/or frequency hopping pattern comprising a fixed number of the plurality of data packets, and the second time hopping pattern and/or frequency hopping pattern comprising a variable number of the plurality of data packets.

For example, the data of variable lengths may be subdivided into the plurality of data packets, so that each data packet of the plurality of data packets comprises a portion of the data of variable lengths.

The data of variable lengths may include a data portion having a fixed length and a data portion having variable lengths. The data transmitter may be configured to send out the data portion having a fixed length by using the first time hopping pattern and/or frequency hopping pattern and to send out the data portion of variable lengths by using the second time hopping pattern and/or frequency hopping pattern.

The data may be a telegram that is split up into the plurality of data packets, each of the plurality of data packets being shorter than the telegram. The data receiver may be configured to combine the plurality of data packets so as to obtain the telegram.

In embodiments, the data contained within the first time hopping pattern and/or frequency hopping pattern may be provided with information about the length of the second time hopping pattern and/or frequency hopping pattern. The data receiver may be configured to extract the information about the length of the second time hopping pattern and/or frequency hopping pattern from the data.

For example, a portion of the data contained within the first time hopping pattern and/or frequency hopping pattern may be used for signaling the length of the second time hopping pattern and/or frequency hopping pattern. The data receiver may be configured to determine the length of the second time hopping pattern and/or frequency hopping pattern from the portion of the data contained within the first time hopping pattern and/or frequency hopping pattern.

In embodiments, the data receiver may be configured to generate the second time hopping pattern and/or frequency hopping pattern on the basis of a portion of the data contained within the first time hopping pattern and/or frequency hopping pattern.

For example, the data receiver may be configured to generate the second time hopping pattern and/or frequency hopping pattern on the basis of error protection data or on a portion of the error protection data contained within the data contained within the first time hopping pattern and/or frequency hopping pattern.

The data receiver may further be configured to generate the second time hopping pattern and/or frequency hopping pattern on the basis of that portion of the data which is used for signaling the length of the second time hopping pattern and/or frequency hopping pattern.

In embodiments, the data receiver may be configured to generate a reference synchronization sequence on the basis of a portion of the data contained within the first time hopping pattern and/or frequency hopping pattern. The data receiver may be configured to receive the data, which is to received while using the second time hopping pattern and/or frequency hopping pattern, while using the reference synchronization sequence.

For example, the data receiver may be configured to generate the reference synchronization sequence on the basis of that portion of the data which is used for signaling the length of the second time hopping pattern and/or frequency hopping pattern.

In embodiments, the data receiver may be configured to use two time hopping subpatterns and/or frequency hopping subpatterns as the first time hopping pattern and/or frequency hopping pattern, a second time hopping subpattern and/or frequency hopping subpattern of the two time hopping subpatterns and/or frequency hop time patterns being a time- or frequency-shifted version of a first time hopping subpattern and/or frequency hopping subpattern of the two time hopping subpatterns and/or frequency hopping subpatterns.

In embodiments, the data transmitter may be configured to use two time hopping subpatterns and/or frequency hopping subpatterns as the second time hopping pattern and/or frequency hopping pattern, a second time hopping subpattern and/or frequency hopping subpattern of the two time hopping subpatterns and/or frequency hop time patterns being a time- or frequency-shifted version of a first time hopping subpattern and/or frequency hopping subpattern of the two time hopping subpatterns and/or frequency hopping subpatterns.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
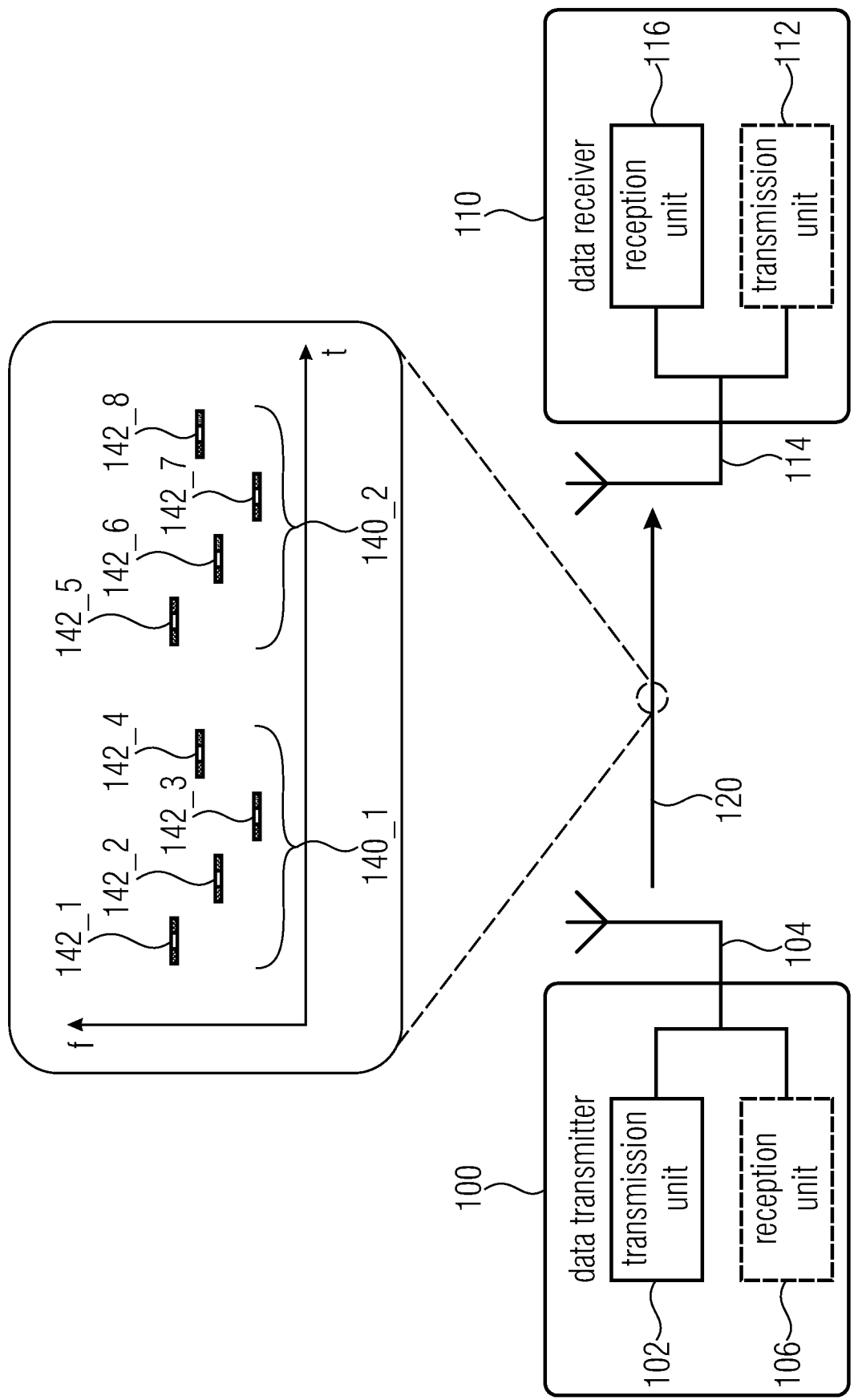
FIG. 1 shows a schematic block diagram of a system comprising a data transmitter and a data receiver, in accordance with an embodiment of the present invention.

In the following description of the embodiments of the present invention, elements which are identical or identical in action will be referred to by identical reference numerals in the figures so that their respective descriptions in the different embodiments are interchangeable.

Formation of Clusters

FIG. 1 shows a schematic block diagram of a system comprising a data transmitter 100 and a data receiver 110, in accordance with an embodiment of the present invention.

The data transmitter 100 is configured to send out data 120 while using at least two time hopping patterns and/or frequency hopping patterns 140_1 and 140_2, a second pattern 140_2 of the at least two patterns 140_1 and 140_2 being a time- and/or frequency-shifted version of a first pattern 140_1 of the at least two patterns 140_1 and 140_2.

The data receiver 110 is configured to receive data 120 while using at least two time hopping patterns and/or frequency hopping patterns 140_1 and 140_2, a second pattern 140_2 of the at least two patterns 140_1 and 140_2 being a time- and/or frequency-shifted version of a first pattern 140_1 of the at least two patterns 140_1 and 140_2.

In FIG. 1, it shall be assumed by way of example that the data is transmitted while using at least two frequency and time hopping patterns (i.e., combined frequency hopping patterns and time hopping patterns) 140_1 and 140_2. Of course, the data 120 may also be transmitted while only using pure frequency hopping patterns or time hopping patterns.

A frequency hopping pattern may be a sequence of transmission frequencies or transmission frequency hops by means of which the data transmitter 100 sends the data.

For example, a first portion of the data may be sent at a first transmission frequency (or within a first frequency channel), and a second portion of the data may be sent at a second transmission frequency (or within a second frequency channel), the first transmission frequency and the second transmission frequency being different. In this context, the frequency hopping pattern may define (or specify or indicate) the first transmission frequency and the second transmission frequency. Alternatively, the frequency hopping pattern may indicate the first transmission frequency and a frequency interval (transmission frequency hop) between the first transmission frequency and the second transmission frequency. Of course, the frequency hopping pattern may indicate only the frequency interval (transmission frequency hop) between the first transmission frequency and the second transmission frequency.

A time hopping pattern may indicate a sequence of transmission times or transmission time intervals at which the data transmitter 100 sends the data.

For example, a first portion of the data may be sent at a first transmission time (or within a first transmission time slot), and a second portion of the data may be sent at a second transmission time (or within a second transmission time slot), the first transmission time and the second transmission time being different. The time hopping pattern may define (or specify or indicate) the first transmission time and the second transmission time. Alternatively, the time hopping pattern may indicate the first transmission time and a time interval between the first transmission time and the second transmission time. Of course, the time hopping pattern may indicate only the time interval between the first time and the second transmission time.

As can be seen in FIG. 1, the second pattern 140_2 may be a time-shifted version of the first pattern 140_1. Alternatively, the second pattern 140_2 may also be a frequency-shifted version of the first pattern 140_1. Of course, the second pattern 140_2 may also be a time- and frequency-shifted version of the first pattern 140_1.

In embodiments, the data 120 may include a plurality of data packets 142_1 to 142_n, which are transmitted from the data transmitter 100 to the data receiver 110 accordingly and/or while using the at least two frequency hopping patterns and/or time hopping patterns 140_1 and 140_2.

In FIG. 1, the data 120 comprises, by way of example, n=8 data packets 142_1 to 142_n, which are transmitted while using m=2 time hopping patterns and/or frequency hopping patterns 140_1 to 140_m. In embodiments, a number n of the data packets may be an integral multiple of a number m of time hopping patterns and/or frequency hopping patterns, so that the data packets may be split up evenly into the number m of time hopping patterns and/or frequency hopping patterns, the number n of the data packets 142_1 to 142_n being at least double the number m of the time hopping patterns and/or frequency hopping patterns 140_1 to 140_m, so that at least two data packets are transmitted in each time hopping pattern and/or frequency hopping pattern 140_1 to 140_m.

The data may be transmitted in such a manner that there are transmission pauses (pauses during which the data transmitter is not transmitting) between the data packets 142_1 to 142_n.

The data may be a telegram split up into the plurality of data packets 142_1 to 142_m, each one of the plurality of data packets 142_1 to 142_m being shorter than the telegram.

In embodiments, the data transmitter 100 may comprise a transmission unit 102 configured to send the data 120. The transmission unit 102 may be connected to an antenna 104 of the data transmitter 100. The data transmitter 100 may further comprise a reception unit 106 configured to receive data. The reception unit may be connected to the antenna 104 or to a further antenna of the data transmitter 100. The data transmitter 100 may also comprise a combined transmission/reception unit (transceiver).

The data receiver 110 may comprise a reception unit 116 configured to receive the data 120. The reception unit 116 may be connected to an antenna 114 or to a further antenna of the data receiver 110. Moreover, the data receiver 110 may comprise a transmission unit 112 configured to transmit data. The transmission unit 112 may also be connected to the antenna 114 of the data receiver 110. The data receiver 110 may also comprise a combined transmission/reception unit (transceiver).

In embodiments, the data transmitter 100 may be a sensor node, whereas the data receiver 110 may be a base station. Of course, it is also possible for the data transmitter 100 to be a base station, while the data receiver 110 is a sensor node. In addition, it is also possible for both the data transmitter 100 and the data receiver 110 to be sensor nodes. In addition, it is possible for both the data transmitter 100 and the data receiver 110 to be base stations.

Detailed embodiments of the transmission method which is presented by means of FIG. 1 and may be performed by the data transmitter 100 and the data receiver 110 will be explained in more detail below.

In this context, embodiments will be described which enable increasing transmission reliability within non-coordinated channels while using the same channel for several subscribers. In addition, transmission may take place in unlicensed bands, wherein further interferences are caused by external systems.

In addition, embodiments will be described which enable reducing the computing power within the base station while using several hopping patterns. Moreover, features will be described which increase the number of possible simultaneous transmissions of two telegrams, i.e., which may therefore increase the channel's capacity utilization while the failure rate remains the same.

Due to limited computing power, existing systems may compute detection via only one or very few hopping patterns in parallel in most cases. If two sensor nodes begin transmitting at the same time, correct decoding will be possible only if two different hopping patterns were used. Otherwise, typically only one or none of both packets may be correctly received and decoded.

Existing systems have used pseudo-random hopping patterns for the time and, if existent, also for the frequency, between all hops 142_1 to 142_n. Detection of the packets for this purpose generally is effected while using the following steps.

A first step includes recovering the presumed symbols (with time and frequency oversampling). A second step includes detection via partial sequences, or hops. A third step includes detection via results of all the partial sequences or hops.

If a further hopping pattern is used instead of a hopping pattern that has been employed, the second step and the third step may be calculated in parallel for both hopping patterns, which highly increases the amount of computing power involved.

Instead of taking a pseudo-random pause and/or frequency hop between each hop 142_1 to 142_n, hops 142_1 to 142_n or partial sequences are combined into clusters 140_1 to 140_m, said clusters 140_1 to 140_m each having a size of at least two hops 142_1 to 142_*n* or partial sequences, as will be explained in more detail below with reference to FIG. 2. As a result, the size of the pseudo-random hopping pattern is reduced by the factor of the cluster length. Additionally, a hopping pattern (time and/or frequency) may be used within the cluster. However, said hopping pattern may be identical in all clusters.

Figure 2:
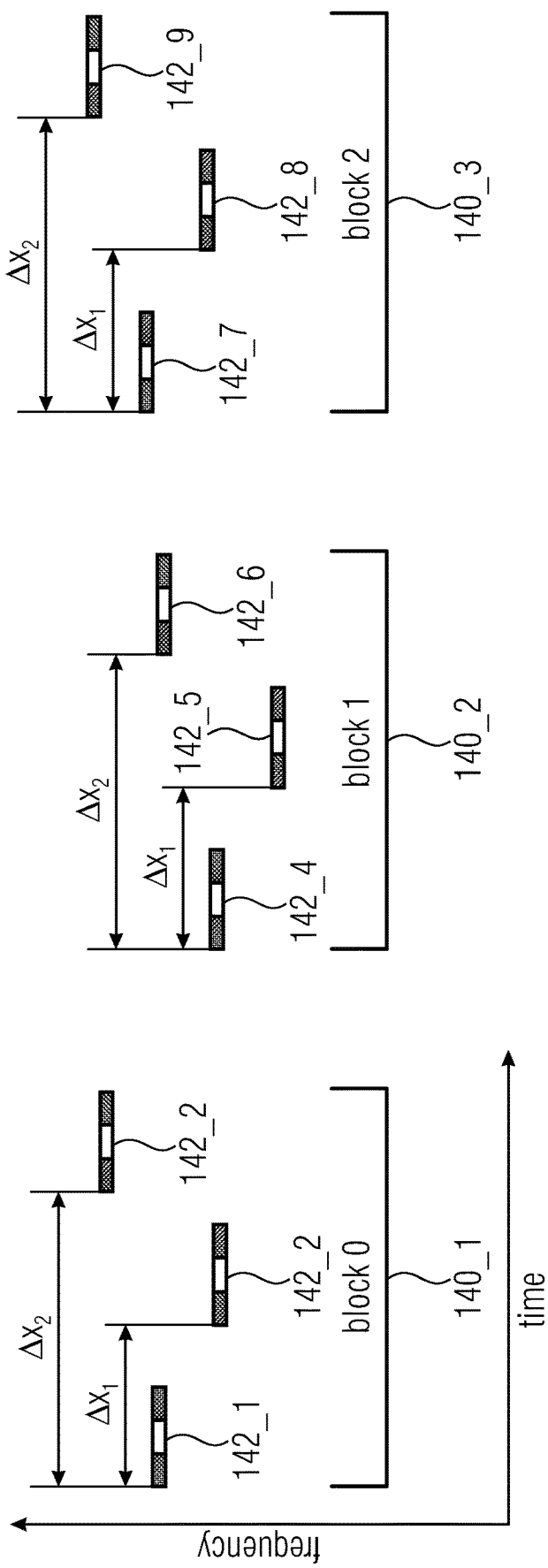
FIG. 2 shows, in a diagram, occupancy of a transmission channel during transmission of a plurality of data packets while using a plurality of time and frequency hopping patterns.

In a diagram, FIG. 2 shows occupancy of a transmission channel in transmitting a plurality of data packets 142_1 to 142_*n* while using a plurality of time and frequency hopping patterns 140_1 to 140_*m*. The ordinate describes the frequency, and the abscissa describes time.

As can be seen in FIG. 2 by way of example, nine data packets 142_1 to 142_9 may be split up into three time and frequency hopping patterns 140_1 to 140_3, so that each of the three time and frequency hopping patterns 140_1 to 140_3 includes three of the data packets 142_1 to 142_9. The second time and frequency hopping pattern 140_2 may be a time- and frequency-shifted version of the first time and frequency hopping pattern 140_1, while the third time and frequency hopping pattern 140_3 may be a time- and frequency-shifted version of the first time and frequency hopping pattern 140_1. The time intervals $\Delta x_1$ and $\Delta x_2$ and frequency intervals between the data packets are the same in all of the three time and frequency hopping patterns 140_1 to 140_3. The data packets 142_1 to 142_9 or at least a portion of the data packets may be provided with synchronization sequences or partial synchronization sequences (split-up synchronization sequence) for synchronization and/or detection at the data receiver.

In other words, FIG. 2 shows splitting of hops 142_1 to 142_*n* into clusters 140_1 to 140_*m*. FIG. 2 shows this method by way of example for nine hops 142_1 to 142_9, which were combined into three clusters 140_1 to 140_3 of the size of three hops. Within said clusters 140_1 to 140_3, the hopping pattern for the time and, optionally, the frequency is the same. In between/among the clusters 140_1 to 140_3, the pauses and frequencies may be different.

Detection may be extended by one further step in calculation, so that detection includes the following steps.

A first step includes recovering the presumed symbols (with time and frequency oversampling). A second step includes detection via partial sequences, or hops. A third step includes detection via results of the partial sequences, or hops, within a cluster. A fourth step includes detection via the results of the clusters.

Despite this extension, less computing power is involved when using several hopping sequences. This is to be demonstrated by the following exemplary calculation for a telegram comprising 30 hops which are split up into a cluster size of three hops and three hopping patterns for a calculation step.

With the classic method, 30 additions of the correlation results of the hops, or partial sequences, are performed for each hopping pattern, i.e., 30 additions/hopping patterns*3 hopping patterns=90 additions.

With the cluster method, the partial results are added into clusters, i.e., 3 hops*1 addition/hops=3 additions. Moreover, the cluster results are added into a telegram correlation, i.e., 10 clusters/hopping patterns*1 addition/cluster*3 hopping patterns=30 additions. In total, 33 additions result.

As can be seen, this results is savings which amount to almost the factor of three (corresponds to the cluster length). Said savings may be exploited for using several hopping patterns.

If two transmissions start at the same point in time, both may be detected and decoded if they have different hopping patterns. By using different hopping patterns, the transmission reliability or throughput can thus be increased.

In embodiments, groups of hops (so-called clusters) within a group may comprise (on the transmitter side or on the waveform side) relative time and frequency hopping patterns which are identical to one another (within the clusters designated here).

In embodiments, the clusters may be used (on the receiver side or decoder side) for detection (see the above description of the cluster method) so as to detect telegrams with simplified computing expenditure.

Variable Number of Hops

Figure 3:
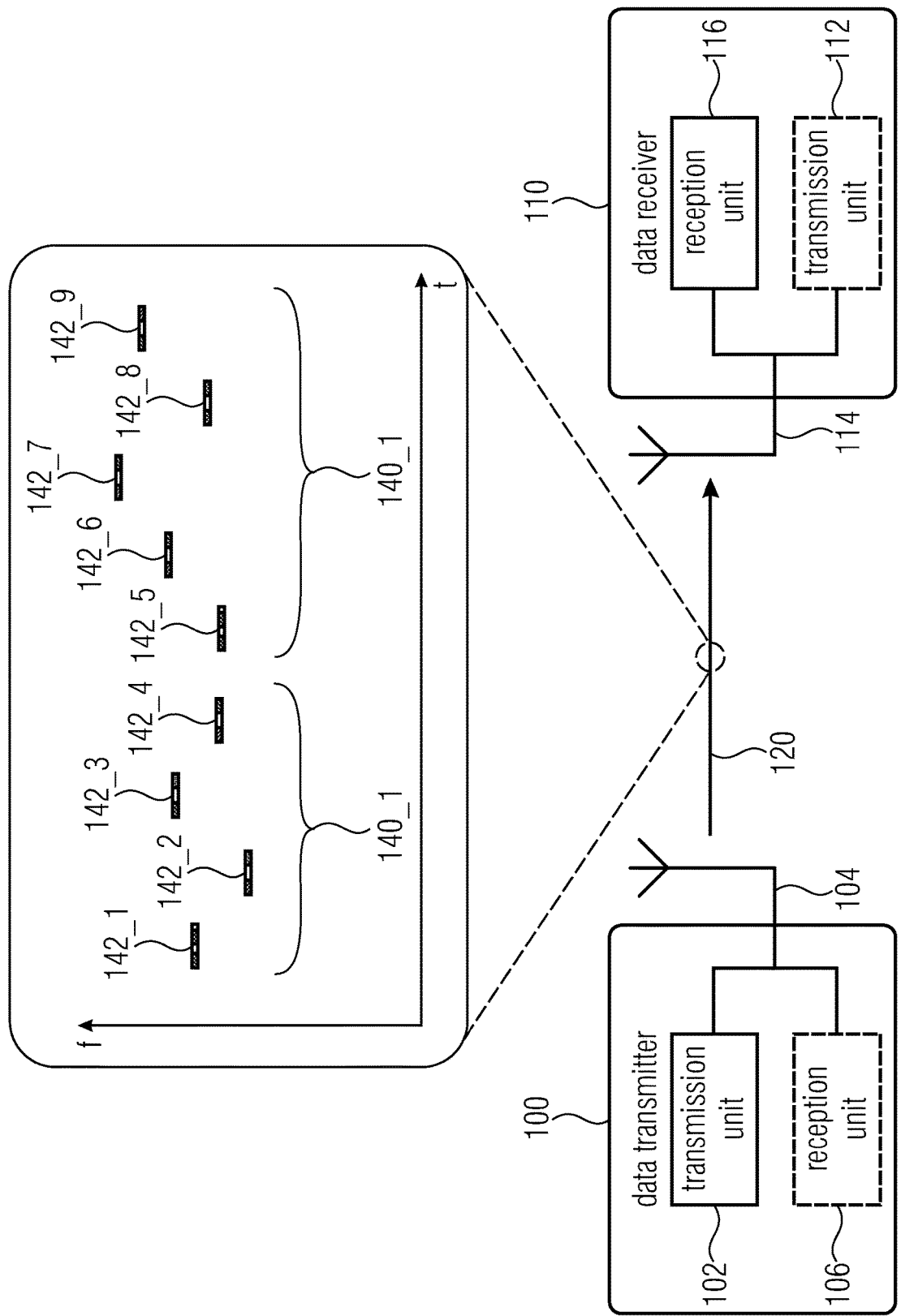
FIG. 3 shows a schematic block diagram of a system comprising a data transmitter and a data receiver, in accordance with a further embodiment of the present invention.

FIG. 3 shows a schematic block diagram of a system comprising a data transmitter 100 and a data receiver 110, in accordance with a further embodiment of the present invention.

The data transmitter 100 is configured to send out data 120 of variable lengths while using a first time hopping pattern and/or frequency hopping pattern 140_1 and while using a second time hopping pattern and/or frequency hopping pattern 140_2, the first time hopping pattern and/or frequency hopping pattern 140_1 having a fixed length, and the second time hopping pattern and/or frequency hopping pattern 140_2 having variable lengths.

The data receiver 110 is configured to receive data 120 of variable lengths while using a first time hopping pattern and/or frequency hopping pattern 140_1 and while using a second time hopping pattern and/or frequency hopping pattern 140_2, the first time hopping pattern and/or frequency hopping pattern 140_1 having a fixed length, and the second time hopping pattern and/or frequency hopping pattern 140_2 having variable lengths.

In FIG. 3, it shall be assumed by way of example that the data is transmitted while using at least two frequency and time hopping patterns (i.e., combined frequency hopping patterns and time hopping patterns) 140_1 and 140_2. Of course, the data 120 may also be transmitted while only using pure frequency hopping patterns or time hopping patterns.

A frequency hopping pattern may be a sequence of transmission frequencies or transmission frequency hops by means of which the data transmitter 100 sends the data.

For example, a first portion of the data may be sent at a first transmission frequency (or within a first frequency channel), and a second portion of the data may be sent at a second transmission frequency (or within a second frequency channel), the first transmission frequency and the second transmission frequency being different. In this context, the frequency hopping pattern may define (or specify or indicate) the first transmission frequency and the second transmission frequency. Alternatively, the frequency hopping pattern may indicate the first transmission frequency and a frequency interval (transmission frequency hop) between the first transmission frequency and the second transmission frequency. Of course, the frequency hopping pattern may indicate only the frequency interval (transmission frequency hop) between the first transmission frequency and the second transmission frequency.

A time hopping pattern may indicate a sequence of transmission times or transmission time intervals at which the data transmitter 100 sends the data.

For example, a first portion of the data may be sent at a first transmission time (or within a first transmission time slot), and a second portion of the data may be sent at a second transmission time (or within a second transmission time slot), the first transmission time and the second transmission time being different. The time hopping pattern may define (or specify or indicate) the first transmission time and the second transmission time. Alternatively, the time hopping pattern may indicate the first transmission time and a time interval between the first transmission time and the second transmission time. Of course, the time hopping pattern may indicate only the time interval between the first time and the second transmission time.

In embodiments, the data 120 of variable lengths may include a plurality of data packets 142_1 to 142_n which are transmitted from the data transmitter 100 to the data receiver 110 in accordance with the first frequency hopping pattern and/or time hopping pattern 140_1 and with the second frequency pattern hopping and/or time hopping pattern 140_2.

In FIG. 3, the data 120 includes, by way of example, nine data packets 142_1 to 142_9, wherein four data packets 142_1 to 142_4 of the nine data packets 142_1 to 142_9 are transmitted while using the first time hopping pattern and/or frequency hopping pattern 140_1, and wherein five data packets 142_5 to 142_9 of the nine data packets 142_1 to 142_9 are transmitted while using the second time hopping pattern and/or frequency hopping pattern 140_2.

The data may be transmitted in such a manner that there are transmission pauses (pauses during which the data transmitter is not transmitting) between the data packets 142_1 to 142_n.

The data may be a telegram split up into the plurality of data packets 142_1 to 142_n, each of the plurality of data packets 142_1 to 142_n being shorter than the telegram. Thus, the plurality of data packets 142_1 to 142_n each contain a different or overlapping portion of the data and/or of the telegram, so that the data is not transmitted en bloc but in a state in which it is split up into the data packets. Since the data packets 142_1 to 142_n contain (only) a portion of the data, they will also be referred to as data subpackets or partial data packets herein.

In embodiments, the data transmitter 100 may comprise a transmission unit 102 configured to send the data 120. The transmission unit 102 may be connected to an antenna 104 of the data transmitter 100. The data transmitter 100 may further comprise a reception unit 106 configured to receive data. The reception unit may be connected to the antenna 104 or to a further antenna of the data transmitter 100. The data transmitter 100 may also comprise a combined transmission/reception unit (transceiver).

The data receiver 110 may comprise a reception unit 116 configured to receive the data 120. The reception unit 116 may be connected to an antenna 114 or to a further antenna of the data receiver 110. Moreover, the data receiver 110 may comprise a transmission unit 112 configured to transmit data. The transmission unit 112 may also be connected to the antenna 114 of the data receiver 110. The data receiver 110 may also comprise a combined transmission/reception unit (transceiver).

In embodiments, the data transmitter 100 may be a sensor node, whereas the data receiver 110 may be a base station. Of course, it is also possible for the data transmitter 100 to be a base station, while the data receiver 110 is a sensor node. In addition, it is also possible for both the data transmitter 100 and the data receiver 110 to be sensor nodes. In addition, it is possible for both the data transmitter 100 and the data receiver 110 to be base stations.

Detailed embodiments of the transmission method which is presented by means of FIG. 3 and may be performed by the data transmitter 100 and the data receiver 110 will be explained in more detail below.

Previous systems have used a fixedly defined number of hops 142_1 to 142_n, which are known to the receiver. In this manner, the receiver knows at any time how many hops 142_1 to 142_n it still has to receive following synchronization. However, if there is less payload (useful data) then can be encoded into the telegram, additional dummy data may be inserted which will be removed again in the receiver. However, this increases channel occupancy even though said data would not have to be transmitted. This results in a higher level of channel occupancy, which leads to an increased probability of collision with other subscribers. Thus, this degrades transmission reliability.

In order to implement variable data lengths, the receiver may be informed about the telegram length used. It would be possible, for example, to signal the length of a next telegram in the previous telegram.

These embodiments adopt a different approach with which it is nevertheless possible to signal the length directly within the telegram being transmitted and, thus, to save the expenditure for few bits to be transmitted which can be protected, in terms of transmission, only by means of a large amount of additional energy by an FEC. For this purpose, a telegram is split up into a core sequence 140_1 and an extension sequence 140_2. The core sequence 140_1 here has a fixed length, which thus represents a minimum length regarding the telegrams. Within the core sequence 140_1, the entire length of the telegram (core sequence+extension sequence) is signaled, and the receiver may, once the core sequence 140_1 has been successfully decoded, infer the extension sequence 140_2 and receive same.

Figure 4:
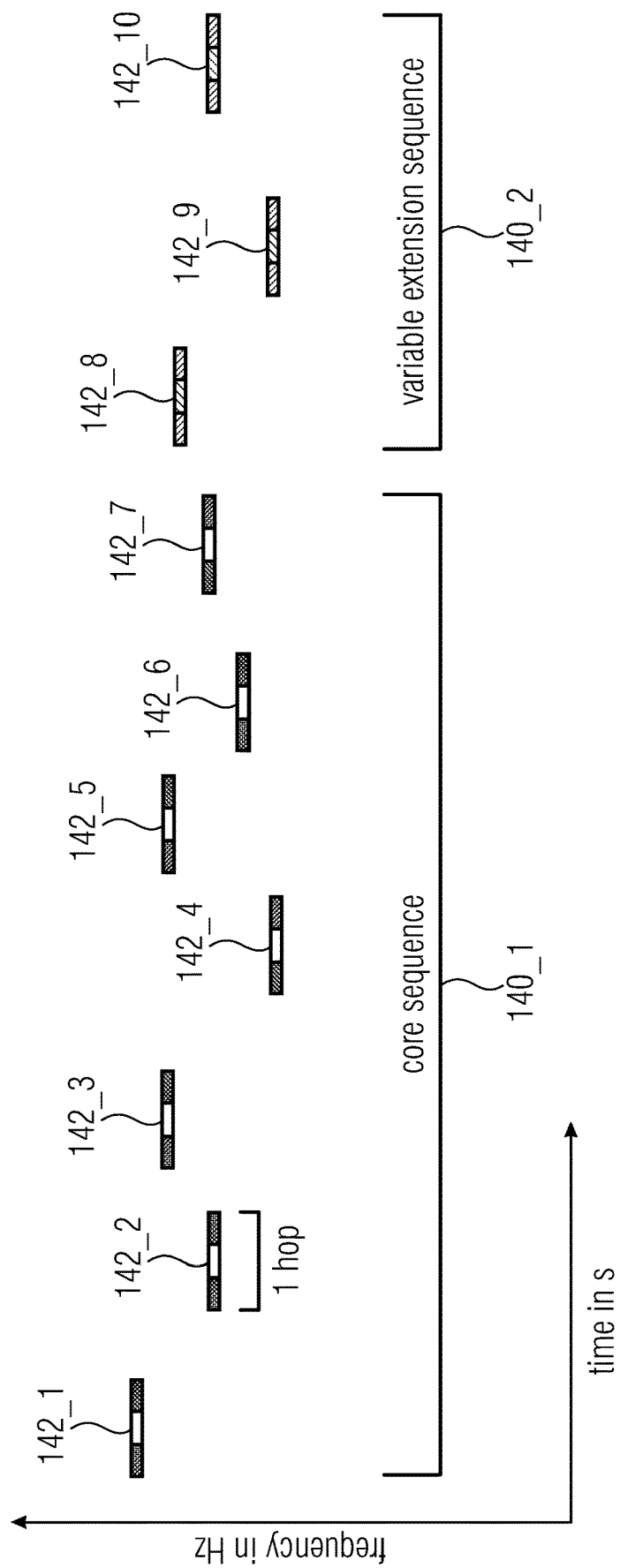
FIG. 4 shows, in a diagram, occupancy of a transmission channel during transmission of a plurality of data packets while using a first time and frequency hopping pattern and a second time and frequency hopping pattern.

In a diagram, FIG. 4 shows occupancy of a transmission channel during transmission of a plurality of data packets 142_1 to 142_10 while using a first time and frequency hopping pattern 140_1 and a second time and frequency hopping pattern 140_2. In this context, the ordinate describes the frequency, and the abscissa describes time.

As can be seen in FIG. 4, the data may include ten data packets 142_1 to 142_10, wherein seven data packets 142_1 to 142_7 are transmitted while using the first time and frequency hopping pattern 140_1, and wherein three data packets 142_8 to 142_10 are transmitted while using the second time and frequency hopping pattern 140_2.

The first time and frequency hopping pattern 140_1 may be a so called core hopping pattern, whereas the second time and frequency hopping pattern 140_2 may be an extension hopping pattern. The data of variable lengths may include core data and extension data, the core data being transmitted while using the core pattern 140_1, and the extension data being transmitted while using the extension pattern 140_2. For example, core data may be data that is to be transmitted, whereas extension data may be data, for example, that is to be transmitted sporadically only.

In other words, FIG. 4 shows a telegram comprising a core sequence and an extension sequence.

In the above-described case, channel encoding may be applied separately, in each case, to the core sequence and to the extension sequence. Of course, channel encoding of the core and extension sequences may also be effected together.

In embodiments, the number of hops may be variable (on the data transmitter side and/or on the waveform side). In addition, the number of hops may be signaled. For example, the amount of hops following within an extension sequence may be signaled within the core sequence.

In embodiments, the decoder may decode the length (on the data transmitter side and/or on the decoder side) and use said information for collecting the data of all hops that may be used and for decoding the entire telegram.

Hopping Patterns of the Extension Sequence

When using the same pattern (time hopping pattern and/or frequency hopping pattern) for the extension sequence 140_2 and within the core sequence 140_1, total superpositions may occur when transmission of the extension sequence 140_2 starts at the "same point in time" as transmission of a further telegram of a different subscriber. The designation "same point in time" here refers to the transmission time of a hop. Ideally, no further telegram with the same hopping pattern should start within said time period.

In order to further reduce the susceptibility of the telegrams to failure, the hopping pattern should therefore not be the same as that of the core sequence.

Since the extension sequence 140_2 is transmitted, e.g., after the core sequence 140_1, synchronization has already occurred. Thus, the hops may be split up randomly in terms of time and possibly frequency as long as the positions are known to the receiver. Said information may be signaled to the receiver. Of course, it is also possible for the core sequence 140_1 to be transmitted after the extension sequence 140_2. In this case, it is possible to extract the extension sequence 140_2 from a reception data buffer following synchronization and/or detection of the core sequence 140_2.

So as not to have to transmit further information for signaling the hopping pattern, a portion of the transmitted payload or the CRC (CRC=cyclic redundancy check) may be used for generating the pattern.

With the aid of said data, the hopping pattern may be retrieved from a look-up table (LUT), for example. It is also possible to generate the hopping pattern by means of the available data by using a feedback shift register (eg. for LFSR (linear feedback shift register)). The CRC or a different portion of the payload may here be used as a seed for the LFSR.

It is the advantage of said method that no additional signal information for the hopping pattern need to be transmitted. This reduces channel occupancy and, therefore, also susceptibility of the other sensor nodes and, possibly, systems within the same frequency band to failure.

In embodiments, the CRC (or other elements) may be used as a pseudo-random number, which is thus known both to the transmitter and to the receiver. The major advantage is that the CRC is almost random and that no further data needs to be transmitted.

A further major advantage of this method is that the extension sequences of (almost) all of the subscribers are different. Therefore, in the event that two transmitters have transmitted a telegram with different core sequences at the same time, the extension sequences will also be transmitted in parallel.

In embodiments, error protection data (e.g. CRC) or other elements and/or portions of the data may be used (on the transmitter side and/or on the waveform side) as a pseudo-random number. The hopping pattern of the extension sequence may be varied. The hopping pattern may be defined by means of the error protection data (e.g. CRC) or other data transmitted.

In embodiments, the decoder may firstly decode (on the receiver side and/or on the decoder side) a portion and use elements from said portion for obtaining information about the decoding of the remainder (or different and/or remaining portion). The decoder may employ the error protection data (e.g. CRC) or other data transmitted so as to obtain information about the structure and/or the decoding of the remainder (or different and/or remaining portion).

Instead of generating the hopping pattern for each partial packet 142_1 to 142_n, several partial packets may be combined into one cluster or block, similarly to the description with regard to FIGS. 1 to 2. The pattern within said cluster/block may differ from that of the core sequence. As a result, the width of the data that may be used for generating the patterns is reduced. This reduces the computing time when using an LFSR or reduces the memory consumption when using LUTs.

The hopping pattern within the cluster may also be acquired from a portion of the transmitted data, as a result of which immunity to interference among several telegrams may be increased.

In embodiments, error protection data (e.g. CRC) or other elements and/or portions of the data may be used (on the transmitter side and/or on the waveform side) as a pseudo-random number. The hopping pattern of the extension sequence may be varied. The hopping pattern may be defined by means of the error protection data (e.g. CRC) or other data transmitted.

In embodiments, the decoder may firstly decode (on the receiver side and/or on the decoder side) a portion and use elements from said portion for obtaining information about the decoding of the remainder (or different and/or remaining portion). The decoder may employ the error protection data (e.g. CRC) or other data transmitted so as to obtain information about the structure and/or the decoding of the remainder (or different and/or remaining portion).

Pilot Symbols within the Extension Sequence

As was already mentioned above, telegram synchronization may be effected as early as on the basis of the core sequence 140_1. Due to phase discontinuities between the individual hops 142_1 to 142_n it is advantageous, for non-differential transmission methods, to introduce pilot symbols into each hop (or into at least a portion of the hops) so as to be able to reconstruct the absolute phase position within the receiver. With the aid of said pilot symbols it is possible, within the core sequence 140_1, to additionally detect the packet and to estimate the time and frequency offsets.

However, within the extension sequence 140_2, synchronization has already been effected, as a result of which only the phase of the hops may be estimated within the extension sequence. With a non-constant frequency offset, the frequency of the hops may additionally be estimated within the extension sequence. If the transmission of the entire telegram (core sequence+extension sequence) exceeds the admissible coherence time (as a function of the quartz used), the time offset may also be re-estimated in the extension sequence.

In order to reduce erroneous detections of the synchronization unit within the receiver, the pilot symbols of the extension sequence 140_2 may have a different order. Said order should exhibit as little a cross correlation as possible, at all sites, with the pilot sequence of the core sequence 140_1 or should differ therefrom in other ways. When using the same sequence as in the core sequence 140_1, the correlation exhibits a maximum and thus might result in erroneous detections more readily.

A good variant for a low cross-correlation result is a random sequence. However, since the latter may be known to the receiver for decoding, it may be obtained from the CRC or from a portion of the payload in a similar manner as generation of the hopping pattern.

In embodiments, pilot symbols which deviate may be used (on the transmitter-side and/or on the waveform side)

in the expansion sequence. The pilot symbol pattern may be defined by means of the error protection data (e.g. CRC) or other transmitted data.

In embodiments, the decoder may use (on the receiver side and/or the decoder side) a different (stored or calculated) pilot symbol pattern for the expansion sequence. Following decoding of the core sequence, the decoder may calculate the pilot symbol pattern by means of the data received.

Instead of using the full length of the pilot sequence, as is the case with the core sequence, the length may be reduced. This is possible since synchronization and/or frequency and time estimation have already been performed.

In order to improve the variance of the phase estimation it is additionally possible to initially decode the inner symbols and to then use them, by means of re-encoding, for phase estimation as well. To this end, the symbols may be sorted within the interleaver such that the first symbols of the data to be transmitted are distributed around the pilot symbols.

In embodiments, different lengths of the pilot symbols may be used (on the transmitter side and/or on the waveform side) within the hops in the core and extension sequences.

In embodiments, different accuracy levels of phase estimation may be present (on the receiver side and/or on the decoder side) within the core and extension sequences.

Possibly, various estimation algorithms may be used for the core and the extension sequences. The extension sequence may be iteratively decoded.

Distribution of the Additional Extension Sequence

Normally, the expansion sequence 140_2 may be appended to the core sequence 140_1. In this manner, one can initially decode the core sequence 140_1 and, subsequently, the extension sequence 140_2. However, this has the disadvantage that with only few additional data for the core sequence 140_1, only a short extension sequence 140_2 will be appended. If a comparatively long interfering influence occurs, a very large number of partial packets (or data packets) of the extension sequence may be interfered with.

Instead of appending all partial packets (or data packets) after the core sequence 140_1, they may also be inserted before the core sequence 140_1. Initially, the core sequence (or the core packet) may be decoded in the receiver in the usual manner. Subsequently, that portion of the extension sequence 140_2 which is inserted at the front may be loaded from a buffer. Once all of the partial packets (data packets) from the buffer are present and once the partial packets have been received after the core sequence 140_1, decoding may be effected in the same manner as before.

In embodiments, the extension sequence may be split up into two parts (on the transmitter side and/or the waveform side). Both parts of the extension sequence 140_2 may be arranged before and after the core sequence 140_1.

In embodiments, decoding or partial decoding of the core sequence may be effected as before (on the receiver side and/or the decoder side). The data of the extension sequence may be cut out from a signal buffer.

It is also possible to introduce partial packets (or data packets) of the extension sequence 140_2 between the partial packets of the core sequence 140_1 if the interval between two partial packets is larger than the duration of a partial packet. This has the advantage that the transmission time for time-critical applications may be reduced.

In embodiments, the extension sequence may be split up into two parts (on the transmitter side and/or the waveform side). Both parts of the extension sequence 140_2 may be arranged before and after the core sequence 140_1.

In embodiments, decoding or partial decoding of the core sequence may be effected as before (on the receiver side and/or the decoder side). The data of the extension sequence may be cut out from a signal buffer.

If telegrams having a large number of payload are transmitted, a very large number of hops result for the extension sequence 140_2 in relation to the core sequence 140_1. Due to the variable data lengths, the number of possible telegrams that may be transmitted per band used changes as a function of the lengths of the payload. If the lengths of the payload are not known at the time of the calculation of the possible telegrams per band and time unit, only coarse estimation may be made.

This problem may be bypassed when transmission of the extension sequence 140_2 takes place within a separate frequency band. In this case, the throughput may be calculated separately on the basis of the core sequence 140_1 for the one band and of the extension sequence 140_2 for the other band.

This additionally offers the major advantage that transmission reliability is further increased since more frequency resources may be utilized for transmission. In principle, the increased transmission reliability might also be implemented by a band (frequency band) that is larger in total, but in this case, detection may also be calculated over the extended band, which involves more computing power.

In embodiments, separate transmissions of the core and extension sequences may be performed within different bands (on the transmitter side and/or on the waveform side).

In embodiments, detection of the packets may take place (on the receiver side and/or decoder side) only within a subrange of the frequency band used. The data of the extension sequence may be cut out and/or extracted from a signal buffer without any detection of their own.

If telegrams having a large number of payload are transmitted, a very large number of hops result for the extension sequence 140_2 in relation to the core sequence 140_1. This results in very long transmission times during which the channel is occupied (on air). If transmission does not take place within the licensed SRD (short range devices) or ISM (industrial, scientific and medical band) bands where limitation of the duty cycle (on-air time) is specified, only a limited number of telegrams may thus be transmitted per time unit.

In order to increase said number of telegrams, the extension sequence 140_2 may have a data rate different from that of the core sequence 140_1. The data rate used of the extension sequence 140_2 may be signalized within the core sequence 140_1. To obtain a reduction of the duty cycle used, the data rate within the extension sequence 140_2 may be increased.

This method offers the further advantage that cable occupancy (on-air time) is reduced while the transmission rate remains unchanged. This favors other systems which also use the same frequency band. In this context, the variable data rates are all detected and synchronized with the same synchronization without any additional computing expenditure.

In embodiments, separate transmission of the core and extension sequences may be effected (on the transmitter side and/or waveform side) at different data rates.

In embodiments, the receiver may change (on the receiver side and/or decoder side) the parameters for decoding of the reception symbols following detection. The data of the extension sequence may be cut out and/or extracted from a signal buffer without any detection of their own.

Further Embodiments

Figure 5:
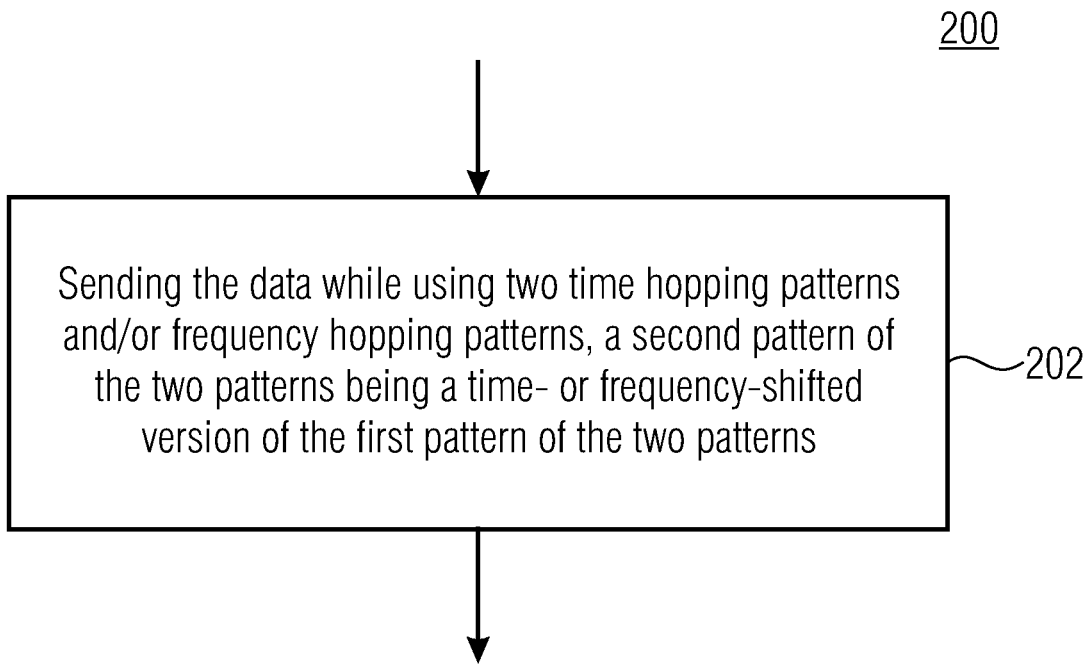
FIG. 5 shows a flow chart of a method of transmitting data, in accordance with an embodiment.

FIG. 5 shows a flow chart of a method 200 of sending data. The method 200 includes a step 202 of sending the data while using two time hopping patterns and/or frequency hopping patterns, a second pattern of the two patterns being a time- and/or frequency-shifted version of a first pattern of the two patterns.

Figure 6:
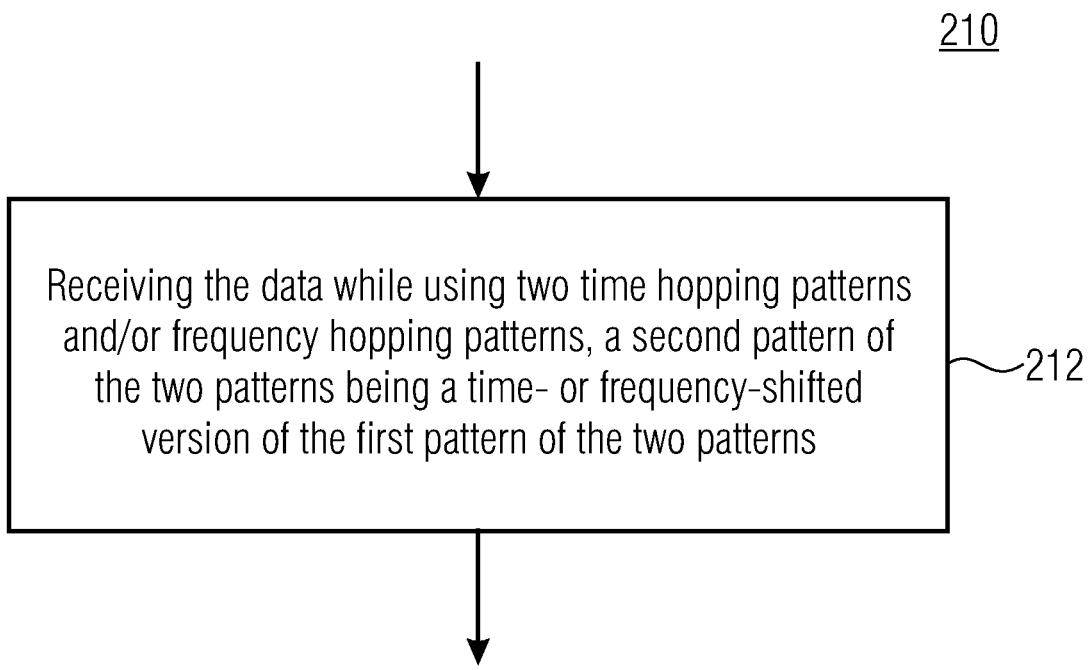
FIG. 6 shows a flow chart of a method of receiving data, in accordance with an embodiment.

FIG. 6 shows a flow chart of a method 210 of receiving data. The method includes a step 212 of receiving the data while using two time hopping patterns and/or frequency hopping patterns, a second pattern of the two patterns being a time- and/or frequency-shifted version of a first pattern of the two patterns.

Figure 7:
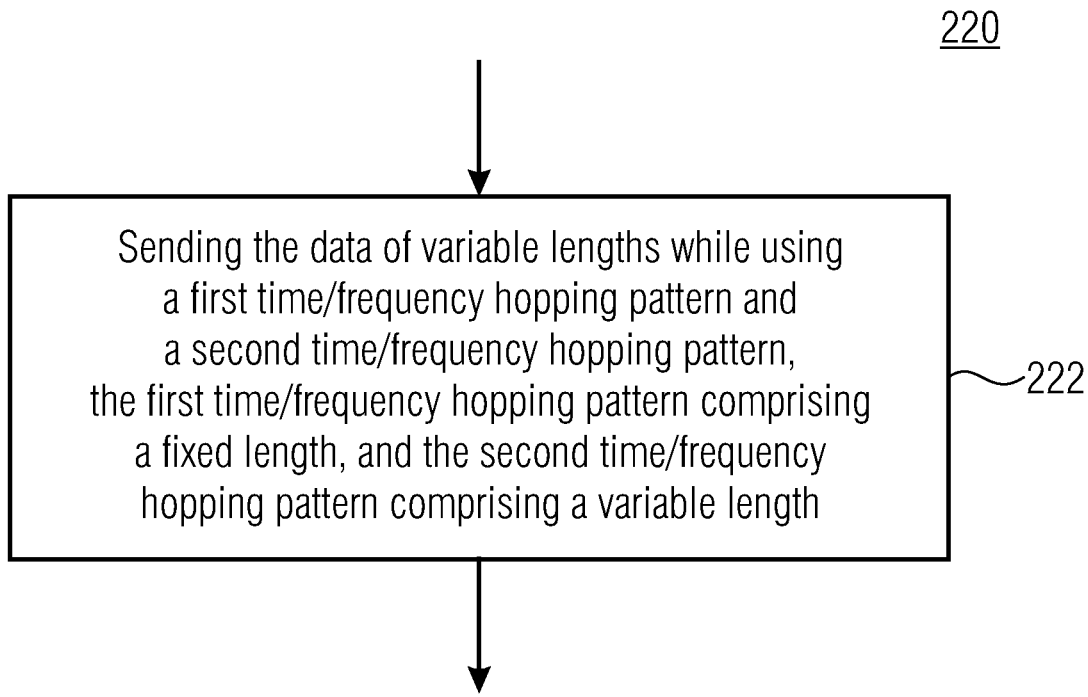
FIG. 7 shows a flow chart of a method of transmitting data, in accordance with a further embodiment.

FIG. 7 shows a flow chart of a method 220 of sending data. The method includes a step 222 of sending the data of variable lengths while using a first a time/frequency hopping pattern and a second time/frequency hopping pattern, the first time/frequency hopping pattern comprising a fixed length, and the second time/frequency hopping pattern comprising a variable length.

Figure 8:
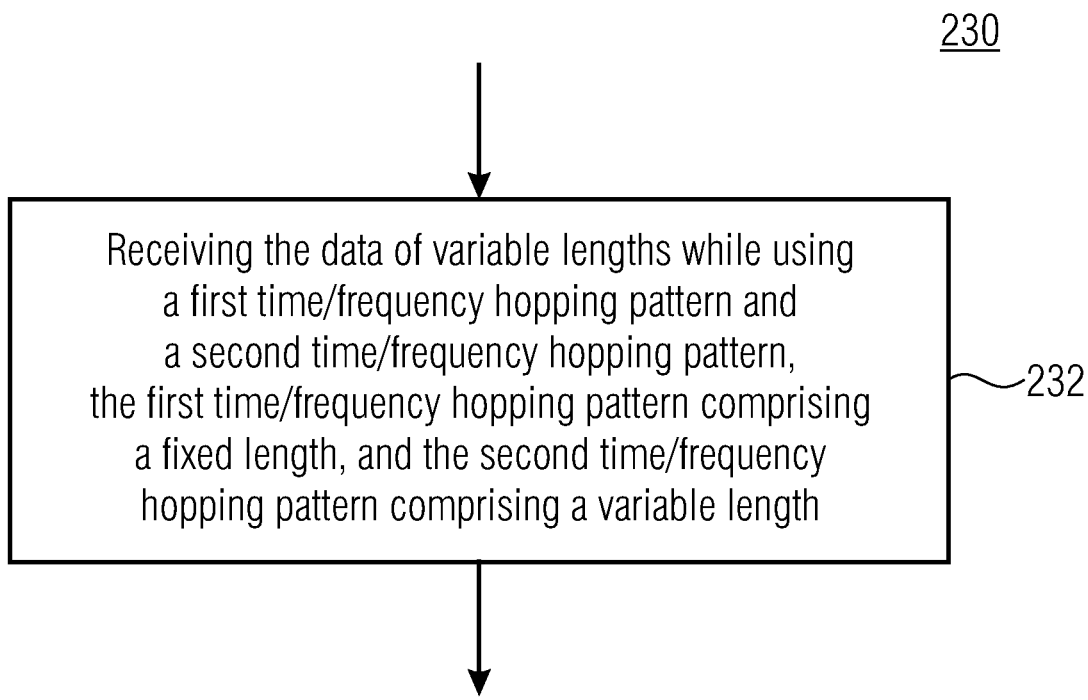
FIG. 8 shows a flow chart of a method of receiving data, in accordance with a further embodiment.

FIG. 8 shows a flow chart of a method 230 of receiving data. The method includes a step 232 of receiving the data of variable lengths while using a first a time/frequency hopping pattern and a second time/frequency hopping pattern, the first time/frequency hopping pattern comprising a fixed length, and the second time/frequency hopping pattern comprising a variable length.

In embodiments, clusters of hops are used for simpler detection.

In embodiments, variable packet lengths may be transmitted by the extension sequence.

In embodiments, the pattern of the extension sequence may be based on error protection data (e.g. CRC).

Embodiments provide a system for transmitting data from many sensor nodes to one base station. The concepts described herein, however, may be used for any transmission if the channel is not coordinated (ALOHA or slotted-ALOHA access method) and if the receiver therefore does not know when a packet is transmitted. Additionally, this may result in superpositions with other subscribers, which causes interferences during transmission.

In this context, the radio transmission band used may, but need not, be exclusively reserved for said transmission. The frequency resource may be shared with many further systems, which renders reliable transmission of the information more difficult.

Embodiments provide a concept for detecting the preamble by means of which the computing power in the receiver may be heavily reduced.

Embodiments provide a concept which enables transmitting variable telegram lengths without previous signaling (within a previous telegram). Here, a telegram is split up into a core sequence and an extension sequence.

Embodiments provide a concept which increases interference immunity of the extension sequence and reduces an error detection rate of the synchronization.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed by a hardware device (or while using a hardware device) such as a microprocessor, a programmable computer or an electronic circuit, for example. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium or the computer-readable medium are typically concrete and/or non-transitory and/or non-transient.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU) or a graphics card (GPU), or may be a hardware specific to the method, such as an ASIC.

The devices described herein may be implemented, e.g, while using a hardware apparatus or while using a computer or while using a combination of a hardware apparatus and a computer.

The devices described herein or any components of the devices described herein may be implemented, at least partly, in hardware or in software (computer program).

The methods described herein may be implemented, e.g., while using a hardware apparatus or while using a computer or while using a combination of a hardware apparatus and a computer.

The methods described herein or any components of the devices described herein may be executed, at least partly, by hardware or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Data transmitter configured to send out data using at least two time and frequency hopping patterns, a second pattern of the at least two patterns being a time- and/or frequency-shifted version of a first pattern of the at least two patterns;
    wherein the data comprises a plurality of data packets, the data transmitter being configured to send out at least two data packets of the plurality of data packets using the first pattern and to send out at least two further data packets of the plurality of data packets using the second pattern;
    wherein the data is a telegram, the data transmitter being configured to split up the telegram into the plurality of data packets, each of the plurality of data packets being shorter than the telegram;
    the data transmitter being configured to distribute a synchronization sequence for synchronizing the data within one data receiver across the two patterns.

2. Data transmitter as claimed in claim 1, the data transmitter being configured to transmit the data via a non-coordinated channel.

3. Data receiver configured to receive data using at least two time and frequency hopping patterns, a second pattern of the at least two patterns being a time- and/or frequency-shifted version of a first pattern of the at least two patterns;
    wherein the data comprises a plurality of data packets, at least two data packets of the plurality of data packets being sent out using the first pattern, and wherein at least two further data packets of the plurality of data packets are sent out by using the second pattern,
    the data receiver being configured to receive the at least two data packets in accordance with the first pattern and to receive the at least two further data packets in accordance with the second pattern;
    wherein the data is a telegram that is split up into the plurality of data packets, each of the plurality of data packets being shorter than the telegram;
    the data receiver being configured to combine at least some of the plurality of data packets in order to acquire the telegram;
    the data receiver being configured to perform a first synchronization for the first pattern in order to acquire a first synchronization result, and to perform a second synchronization for the second pattern in order to acquire a second synchronization result;
    the data receiver being configured
        to combine the first synchronization result and the second synchronization result
        or to perform the second synchronization for the second pattern using the first synchronization result
    in order to acquire a total synchronization result.

4. Data receiver as claimed in claim 3, the data receiver being configured to receive the data via a non-coordinated channel.

5. Data receiver as claimed in claim 3, the data receiver being configured to acquire a further synchronization result for the second synchronization using the first synchronization result in order to acquire a further total synchronization result.

6. Data receiver as claimed in claim 3, the data receiver being configured to acquire a second synchronization result for the second synchronization and to combine the first synchronization result of the first synchronization and a second synchronization result of the second synchronization in order to acquire a total synchronization result.

7. Data receiver as claimed in claim 3, wherein a synchronization sequence for synchronizing the data is distributed across the at least two patterns,
    the data receiver being configured to perform synchronization using the synchronization sequence in order to detect the data in a reception data stream.

8. System comprising:
    a data transmitter as claimed in claim 1; and
    a data receiver as claimed in claim 3.

9. Data transmitter configured to send out data of variable lengths using a first time hopping pattern and/or frequency hopping pattern and using a second time hopping pattern and/or frequency hopping pattern, the first time hopping pattern and/or frequency hopping pattern comprising a fixed length and the second time hopping pattern and/or frequency hopping pattern comprising a variable length;
    the data transmitter being configured to generate the second time hopping pattern and/or frequency hopping pattern on the basis of the portion of the data comprised by the first time hopping pattern and/or frequency hopping pattern;
    wherein the data comprises error protection data, the data transmitter being configured to generate the second time hopping pattern and/or frequency hopping pattern on the basis of the error protection data or of a portion of the error protection data.

10. Data transmitter as claimed in claim 9, wherein the data comprises a plurality of data packets, the first time hopping pattern and/or frequency hopping pattern comprising a fixed number of the plurality of data packets, and the second time hopping pattern and/or frequency hopping pattern comprising a variable number of the plurality of data packets.

11. Data transmitter as claimed in claim 9, wherein the first time hopping pattern and/or frequency hopping pattern and the second time hopping pattern and/or frequency hopping pattern differ from one other even in the event that they exhibit equal lengths.

12. Data transmitter as claimed in claim 9, the data transmitter being configured to use a portion of the data comprised by the first time hopping pattern and/or frequency hopping pattern for signaling the length of the second time hopping pattern and/or frequency hopping pattern.

13. Data transmitter as claimed in claim 9, the data transmitter being configured to generate a synchronization sequence for the second time hopping pattern and/or frequency hopping pattern on the basis of a portion of the data comprised by the first time hopping pattern and/or frequency hopping pattern.

14. Data transmitter as claimed in claim 9, the data transmitter being configured to provide the first time hopping pattern and/or frequency hopping pattern and the second time hopping pattern and/or frequency hopping pattern with different synchronization sequences.

15. Data transmitter configured to send out data of variable lengths using a first time hopping pattern and/or frequency hopping pattern and using a second time hopping pattern and/or frequency hopping pattern, the first time hopping pattern and/or frequency hopping pattern comprising a fixed length, and the second time hopping pattern and/or frequency hopping pattern comprising a variable length;
  the data transmitter being configured to generate the second time hopping pattern and/or frequency hopping pattern on the basis of the portion of the data comprised by the first time hopping pattern and/or frequency hopping pattern.

16. Data transmitter configured to send out data of variable lengths using a first time hopping pattern and/or frequency hopping pattern and using a second time hopping pattern and/or frequency hopping pattern, the first time hopping pattern and/or frequency hopping pattern comprising a fixed length, and the second time hopping pattern and/or frequency hopping pattern comprising a variable length;
  the data transmitter being configured to provide the data comprised by the first time hopping pattern and/or frequency hopping pattern with information about the length of the second time hopping pattern and/or frequency hopping pattern so as to signal the length of the second time hopping pattern and/or frequency hopping pattern.

17. Data receiver configured to receive data of variable lengths using a first time hopping pattern and/or frequency hopping pattern and using a second time hopping pattern and/or frequency hopping pattern, the first time hopping pattern and/or frequency hopping pattern comprising a fixed length, and the second time hopping pattern and/or frequency hopping pattern comprising a variable length;
  the data receiver being configured to generate the second time hopping pattern and/or frequency hopping pattern on the basis of a portion of the data comprised by the first time hopping pattern and/or frequency hopping pattern;
  the data receiver being configured to generate the second time hopping pattern and/or frequency hopping pattern on the basis of error protection data or of a portion of the error protection data comprised by the data comprised by the first time hopping pattern and/or frequency hopping pattern.

18. Data receiver as claimed in claim 17, the data receiver being configured to determine a length of the second time hopping pattern and/or frequency hopping pattern from the data comprised by the first time hopping pattern and/or frequency hopping pattern.

19. Data receiver as claimed in claim 17, wherein the data comprises a plurality of data packets, the first time hopping pattern and/or frequency hopping pattern comprising a fixed number of the plurality of data packets, and the second time hopping pattern and/or frequency hopping pattern comprising a variable number of the plurality of data packets.

20. Data receiver as claimed in claim 17, wherein a portion of the data comprised by the first time hopping pattern and/or frequency hopping pattern is used for signaling the length of the second time hopping pattern and/or frequency hopping pattern;
  the data receiver being configured to determine the length of the second time hopping pattern and/or frequency hopping pattern from the portion of the data comprised by the first time hopping pattern and/or frequency hopping pattern.

21. Data receiver as claimed in claim 17, the data receiver being configured to generate a reference synchronization sequence on the basis of a portion of the data comprised by the first time hopping pattern and/or frequency hopping pattern;
  the data receiver being configured to receive the data, which is to received using the second time hopping pattern and/or frequency hopping pattern, using the reference synchronization sequence.

22. Data receiver configured to receive data of variable lengths using a first time hopping pattern and/or frequency hopping pattern and using a second time hopping pattern and/or frequency hopping pattern, the first time hopping pattern and/or frequency hopping pattern comprising a fixed length, and the second time hopping pattern and/or frequency hopping pattern comprising a variable length;
  the data receiver being configured to generate the second time hopping pattern and/or frequency hopping pattern on the basis of a portion of the data comprised by the first time hopping pattern and/or frequency hopping pattern.

23. Data receiver configured to receive data of variable lengths using a first time hopping pattern and/or frequency hopping pattern and using a second time hopping pattern and/or frequency hopping pattern, the first time hopping pattern and/or frequency hopping pattern comprising a fixed length, and the second time hopping pattern and/or frequency hopping pattern comprising a variable length;
  wherein the data comprised by the first time hopping pattern and/or frequency hopping pattern is provided with information about the length of the second time hopping pattern and/or frequency hopping pattern;
  the data receiver being configured to extract the information about the length of the second time hopping pattern and/or frequency hopping pattern from the data.

24. System comprising:
a data transmitter as claimed in claim 9 or claim 15 or claim 16; and
a data receiver as claimed in claim 17 or claim 22 or claim 23.

25. Method of transmitting data, comprising:
transmitting the data using two time hopping patterns or frequency hopping patterns, a second pattern of the two patterns being a time- or frequency-shifted version of a first pattern of the two patterns;

wherein the data comprises a plurality of data packets, wherein at least two data packets of the plurality of data packets are sent out by using the first pattern, and wherein at least two further data packets of the plurality of data packets are sent out by using the second pattern;

wherein the data is a telegram, the telegram is split up into the plurality of data packets, each of the plurality of data packets being shorter than the telegram;

a synchronization sequence for synchronizing the data within a data receiver is distributed across the two patterns.

26. Method of receiving data, comprising:

receiving the data using two time hopping patterns or frequency hopping patterns, a second pattern of the two patterns being a time- or frequency-shifted version of a first pattern of the two patterns;

wherein the data comprises a plurality of data packets, wherein at least two data packets of the plurality of data packets are sent out by using the first pattern, and wherein at least two further data packets of the plurality of data packets are sent out by using the second pattern;

wherein the at least two data packets are received in accordance with the first pattern, and wherein the at least two further data packets are received in accordance with the second pattern;

wherein the data is a telegram split up into the plurality of data packets, each of the plurality of data packets being shorter than the telegram;

the method further comprising combining at least a portion of the plurality of data packets in order to acquire the telegram;

wherein the method further comprises performing a first synchronization for the first pattern in order to acquire a first synchronization result, and performing a second synchronization for the second pattern in order to acquire a second synchronization result;

the method further comprising
combining the first synchronization result and the second synchronization result,
or performing the second synchronization for the second pattern using the first synchronization result,
in order to acquire a total synchronization result.

27. Method of transmitting data of variable lengths, comprising:

transmitting the data of variable lengths using a first time/frequency hopping pattern and a second time/frequency hopping pattern, the first time/frequency hopping pattern comprising a fixed length, and the second time/frequency hopping pattern comprising a variable length;

wherein the second time hopping pattern and/or frequency hopping pattern is generated on the basis of a portion of the data comprised by the first time hopping pattern and/or frequency hopping pattern; and wherein the second time hopping pattern and/or frequency hopping pattern is generated on the basis of error protection data or of a portion of the error protection data comprised by the first time hopping pattern and/or frequency hopping pattern.

28. Method of receiving data of variable lengths, comprising:

receiving the data of variable lengths using a first time/frequency hopping pattern and a second time/frequency hopping pattern, the first time/frequency hopping pattern comprising a fixed length, and the second time/frequency hopping pattern comprising a variable length;

wherein the second time hopping pattern and/or frequency hopping pattern is generated on the basis of a portion of the data comprised by the first time hopping pattern and/or frequency hopping pattern;

wherein the second time hopping pattern and/or frequency hopping pattern is generated on the basis of error protection data or of a portion of the error protection data comprised by the first time hopping pattern and/or frequency hopping pattern.

29. A non-transitory digital storage medium having a computer program stored thereon to perform the method as claimed in claim 25 or claim 26 or claim 27 or claim 28, when said computer program is run by a computer.

* * * * *